(12) United States Patent
Songer et al.

(10) Patent No.: US 7,080,283 B1
(45) Date of Patent: Jul. 18, 2006

(54) SIMULTANEOUS REAL-TIME TRACE AND DEBUG FOR MULTIPLE PROCESSING CORE SYSTEMS ON A CHIP

(75) Inventors: Christopher M. Songer, San Jose, CA (US); John Newlin, Sunnyvale, CA (US); Srikanth Nuggehalli, Saratoga, CA (US); David Glen Jacobowitz, Campbell, CA (US)

(73) Assignee: Tensilica, Inc., Santa Clara, CA (US)

( * ) Notice: Subject to any disclaimer, the term of this patent is extended or adjusted under 35 U.S.C. 154(b) by 634 days.

(21) Appl. No.: 10/272,029

(22) Filed: Oct. 15, 2002

(51) Int. Cl.
*G06F 11/00* (2006.01)

(52) U.S. Cl. .......................................... 714/30; 714/31

(58) Field of Classification Search .................. 714/30, 714/31
See application file for complete search history.

(56) References Cited

U.S. PATENT DOCUMENTS

| | | | |
|---|---|---|---|
| 5,717,701 A * | 2/1998 | Angelotti et al. | 714/30 |
| 6,115,763 A * | 9/2000 | Douskey et al. | 710/72 |
| 6,363,510 B1 * | 3/2002 | Rhodes et al. | 714/738 |
| 6,385,749 B1 * | 5/2002 | Adusumilli et al. | 714/733 |
| 6,523,136 B1 * | 2/2003 | Higashida | 714/30 |
| 6,760,864 B1 * | 7/2004 | Wood et al. | 714/30 |
| 6,907,548 B1 * | 6/2005 | Abdo | 714/43 |
| 2001/0005896 A1 * | 6/2001 | Totorica et al. | 714/724 |
| 2002/0049928 A1 * | 4/2002 | Whetsel et al | 714/30 |
| 2004/0168105 A1 * | 8/2004 | Haroun et al. | 714/30 |

\* cited by examiner

*Primary Examiner*—Robert Beausoliel
*Assistant Examiner*—Michael Maskulinski
(74) *Attorney, Agent, or Firm*—Pillsbury Winthrop et al.

(57) ABSTRACT

A system for providing simultaneous, real-time trace and debug of a multiple processing core system on a chip (SoC) is described. Coupled to each processing core is a debug output bus. Each debug output bus passes a processing core's operation to trace capture nodes connected together in daisy-chains. Trace capture node daisy-chains terminate at the trace control module. The trace control module receives and filters processing core trace data and decides whether to store processing core trace data into trace memory. The trace control module also contains a shadow register for capturing the internal state of a traced processing core just prior its tracing. Stored trace data, along with the corresponding shadow register contents, are transferred out of the trace control module and off the SoC into a host agent and system running debugger hardware and software via a JTAG interface.

38 Claims, 15 Drawing Sheets

SIMULTANEOUS REAL-TIME TRACE AND DEBUG FOR MULTIPLE PROCESSING CORE SYSTEMS ON A CHIP

CROSS-REFERENCE TO RELATED APPLICATIONS

This application is related to U.S. patent application Ser. No. 09/680,126 to Newlin et al., the contents of which are hereby incorporated by reference, and which is commonly owned by the present assignee.

BACKGROUND OF THE INVENTION

1. Field of the Invention

The present invention is directed to the development of an integrated circuit containing multiple processing cores on a single chip (i.e., a system on a chip). More particularly, the present invention is directed towards tracing and debugging logic and techniques for simultaneously ascertaining and displaying the real-time state of any number of the processing cores on the integrated circuit as they operate.

2. Background of the Related Art

The system on a chip (SoC) field has arisen as the amount of digital logic that can be placed on a single semiconductor chip has substantially exceeded the amount of digital logic required by a single processing core (Throughout this specification, the term 'processing core' is generically used to refer to any on-chip logic device, such as a microprocessor, microcontroller, memory management unit, arithmetic logic unit, audio-video controller, etc., that extracts stored instructions from memory, decodes them, and executes them using a program counter or the like.). SoC technology uses that additional capacity to create separate processing cores on the silicon. These processing cores can now be quite complex and do substantial amounts of work without predetermined cycle by cycle interaction with other cores on the SoC. These processing cores can also simultaneously run different software programs, some of which may interact with each other as well as with devices off the SoC. Simultaneously ascertaining the current state of these processing cores as they operate is of primary importance for debugging the SoC.

Traditionally, processing cores have been manufactured each on their own chip, with all their input and output (IO) signals connected to the exterior of the packaged chip. Because of this, it has always been possible to observe the operation of a processing core by attaching test equipment to its external IO signals and monitoring them. The information gathered by monitoring these external IO signals is called a trace. The trace is useful when analyzing the behavior, or misbehavior, of the processing core. The trace can show problems in the programming of the processing core and point to errors in the processing core hardware. The trace can be thought of as an external recording of the activity of the processing core that a user can play back with software tools in order to understand what internal operations the processing core took and why.

Because of the complex nature of modern processing cores, the trace of external IO signals is often augmented with other data to give a user additional visibility into the processing core's internal operation. Bringing selected internal signals of the processing core to the outside of the packaged chip as additional output signals accomplishes this augmentation. Often times, a processing core will be packaged in two versions. One version will be for general use and will not have the additional output signals connected outside the package. The other special version, specifically designed for debugging, will include the additional output signals. This special version is generally referred to as an In-Circuit Emulation (ICE) processing core design.

There are numerous factors in the design of modern multiple processing core SoCs that make the above strategies increasingly insufficient.

First, the speed at which internal logic can operate on a chip is becoming significantly faster than the speed at which IO logic can be routed off and external to the chip. Modern processing cores run at internal speeds exceeding 400 MHz, while the speed of signals routed off of the chip is much lower. This is a practical necessity, since handling high-speed signals outside the chip is much more difficult than handling them inside the chip. Some processing core IO signals, for example those used for memory access, can be slowed down. Unfortunately, the signals that convey trace data of a processing core off of a chip cannot be slowed down without also slowing down the internal speed of the processing core, since those trace data signals reflect the real-time, internal state of the processing core. To provide useful information, trace data must run at the internal rate of the processing core. Toggling external IO pins at the internal processing core speed can be either prohibitively expensive or impossible.

A second reason that traditional ICE processing core designs are no longer sufficient is that chip packages are becoming much larger. As chip sizes increase, the number of transistors on a chip increases much faster than the possible number of IO signals off the chip. This is often referred to as Rent's Rule. In many modern chip designs the chip is said to be pad or IO limited, which means that based on the size of the chip, there is not sufficient room for all the IO signals that the designers would like, or need, to have routed off the chip. In such environments, adding additional IO signals for the sole purpose of software debugging can seem unnecessarily expensive, if not impossible.

Another problem facing ICE design solutions is that instead of being manufactured on individual chips, processing cores are increasingly being combined together as part of a much larger embedded system, or SoC, on a single chip. The processing cores on an SoC may not be connected to the SoC's external IO signals at all (i.e., those IO signals routed off-chip). Instead, they may be completely embedded within the SoC, with their own IO signals connected only to other devices within the SoC. In such a situation, it can be nearly impossible to directly observe the operation of the embedded processing core, because there are no IO signals external to the SoC coming from that processing core. The issue of Rent's Rule exacerbates this problem because each of the embedded SoC processing cores is generating as much information in one clock cycle as a stand-alone, single chip, processing core would have generated. Consequently, the problem of operational observability is even more difficult for multiple processing cores embedded within an SoC.

Co-pending U.S. patent application Ser. No. 09/680,126 to Newlin et al. dramatically advanced the state of the art of debugging SoCs. As disclosed therein, JTAG devices on an SoC can be serially connected together and communicate off-chip using the IEEE 1149.1 JTAG specification. The IEEE 1149.1 JTAG specification defines a communication format that uses five signals to control a series of devices called TAP controllers. This specification is attractive for low performance communication with devices on an SoC because of the relatively small number of signals that it uses. Having individual units with TAP controllers on an SoC allows debugging tools to retrieve JTAG information from the SoC. However, even with these advancements, challenges remain. The JTAG interface is relatively slow, and does not provide for real-time tracing. The JTAG chain does not handle simultaneous trace output from multiple processing cores on an SoC. Finally, the JTAG chain is not designed to handle the amount of data necessary to produce simultaneous real-time trace of multiple-cores on an SoC.

Another problem facing simultaneous real-time multiple processing core SoC debugging is accurately reconstructing a traced processor core's internal register values during trace playback. Trace streams often trace the execution address of the processing core (the PC) but not the register values. This limits the usefulness of the trace. Consider the following C code:

```
typedef void (*DRIVER_FUNC) (void *);
DRIVER_FUNC driver_tablet[10] = { . . . };
void call_through( int I, void *arg )
{
    driver_table[I] ( arg );
}
```

A trace of the execution stream of a processing core executing this code will show the one statement in the function being executed, and it will show the address called through the driver_table but it will not show the value of I. If this statement is incorrect, a trace of the execution stream will show that this is the problem statement but will not give insight as to why the statement is incorrect. In particular, there are two reasons this could be producing the wrong behavior. The contents of driver_table could be corrupted or I could be invalid. Without knowing the value of I, discerning between these two problems can be difficult. Knowing the contents of I requires the tracing of register data in addition to the tracing of the PC.

Yet another problem facing simultaneous real-time multiple processing core SoC debugging is accurately reconstructing a traced processing core's internal register values during lengthy loops. To illustrate this shortcoming, consider a traced processing core running the following C function:

```
int sum( int val, int rep )
{
    int j = 0;
    int sum = 0;
    while( j < rep )
    {
        sum = sum + val;
        j = j - 1;
    }
    return sum;
}
```

This simple function is really just a loop that multiplies the integer val times the integer rep. While the function may seem trivial, it illustrates an important challenge to debugging this SoC. The function, when compiled by a C compiler, generates the following assembly code.

| | entry | sp, 32 |
|---|---|---|
| | mov.n | a5, a2 |
| | movi.n | a2, 0 |
| | mov.n | a4, a2 |

-continued

| | | |
|---|---|---|
| | bge | a2, a3, .L2 |
| .L3: | add.n | a2, a2, a5 |
| | addi.n | a4, a4, −1 |
| | blt | a4, a3, .L3 |
| .L2: | retw.n | |

The body of the loop in this code is between the .L3: label and the blt instruction. Blt is a branch instruction and is responsible for transferring control to the top of the loop. Note that the a5 register is referenced, but not written to, in the loop body. The loop consists of three instructions and each iteration will require at least three trace entries if the state of the processing core is to be tracked accurately and in real-time. Memory available for storing the traces is a fixed size and after some number of iterations through the loop, the trace entries tracking the instructions immediately prior to the loop will be lost, or overwritten. It is in these pre-loop instructions that the value of a5 was written. Upon losing the pre-loop instructions, the value of a5 will no longer be available to the user. In general, if a write to a register is not captured and maintained within a trace sample, that information is missing for any subsequent debugging and analysis.

SUMMARY OF THE INVENTION

The present invention has been made with problems of the prior art in mind and generally facilitates capturing simultaneous real-time trace data from an arbitrary subset of any number of processing cores residing on a single integrated circuit chip (i.e., a system on a chip). Further, the invention selectively collects, stores and analyzes the captured trace data.

According to one aspect of the invention, coupled to each processing core on the system on a chip (SoC) from which trace data might be desired, is at least one debug output bus. Each debug output bus can be configured to include some or all signals necessary to follow a processing core's operation, and to recreate all or part of the processing core's current state in a software debugger. In addition to the debug output bus, an apparatus according to an example of the invention includes a trace control module. The trace control module receives the real-time trace data from the processing cores and is capable of deciding whether and when to store trace samples into trace memory. The interconnect between the processing cores and the trace control module is another aspect of the invention. According to this aspect, processing core signals are passed via a debug output bus to one or more trace capture nodes, where respective trace capture nodes are connected together in one or more daisy-chain bus configurations. Trace capture node daisy-chains terminate at the trace control module.

According to a further aspect of the invention, the trace control module can also contain a shadow register file for traced processing cores. The shadow register file can be used to maintain a copy of the internal state of the processing cores at the point immediately prior to when the trace control module began storing real-time trace data into trace memory.

After simultaneous real-time trace data have been stored into trace memory, the stored trace data along with the corresponding shadow register file contents can be transferred out of the trace control module and off the SoC into a host agent running debugger hardware and software. Another aspect of the invention includes software that transfers the trace data from the SoC to a host computer. This transfer software can reconstruct register values of the traced processing cores using shadow register file data. This transfer software is also capable of reconstructing register values of the traced processing cores without using a shadow register file.

BRIEF DESCRIPTION OF THE DRAWINGS

The above-mentioned and other features and advantages of the present invention will become more apparent from the detailed description set forth below when taken in conjunction with the drawings in which like reference characters identify correspondingly throughout and wherein.

DETAILED DESCRIPTION OF THE INVENTION

The present invention will now be described in detail with reference to the accompanying drawings, which are provided as illustrative examples of preferred embodiments of the present invention and to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future equivalents to the known components referred to herein by way of illustration.

Figure 1:
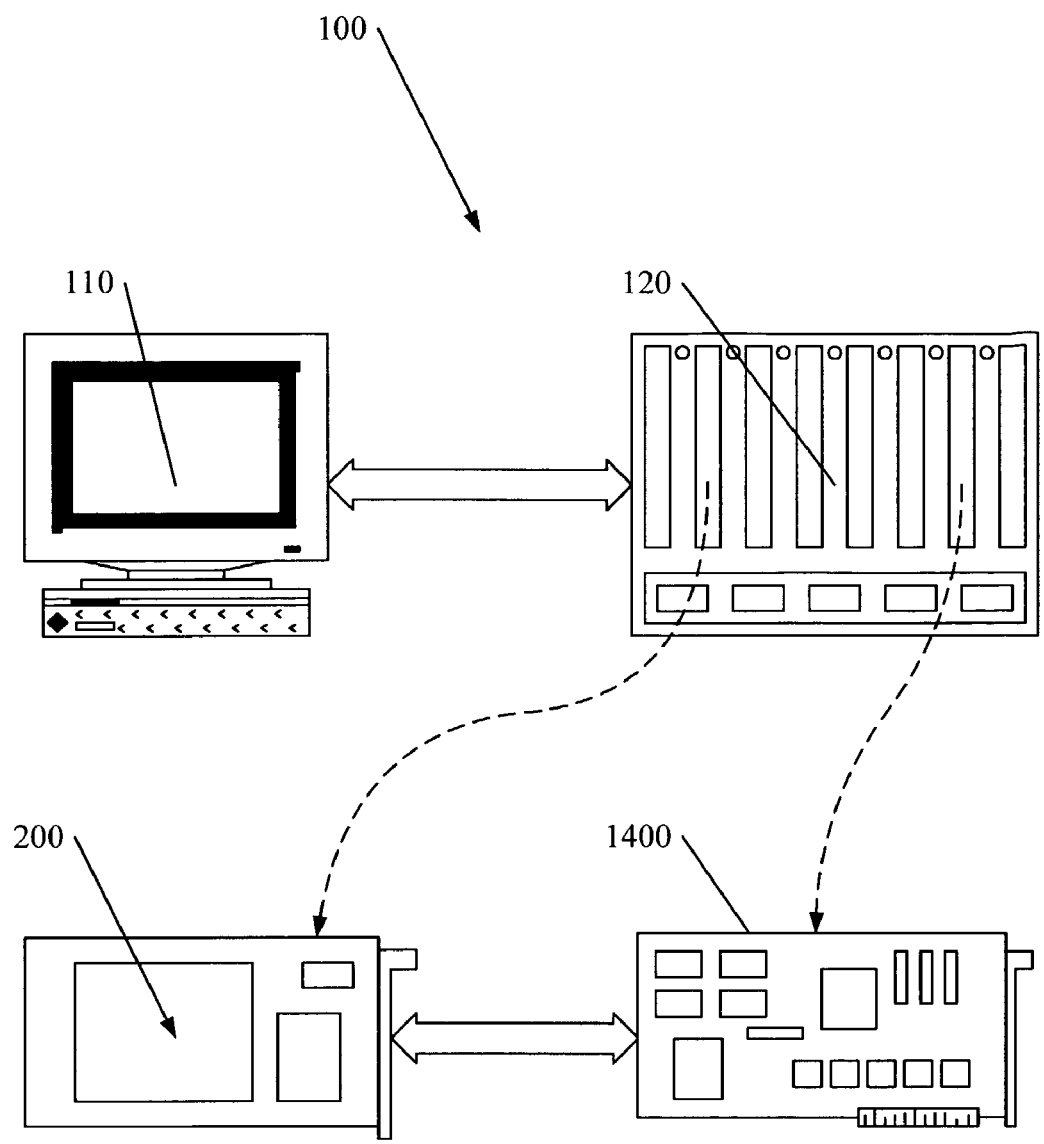
FIG. 1 shows an SoC trace and debug system of the present invention.

FIG. 1 shows a presently preferred embodiment of the present invention that encompasses a system 100 for debugging a system on a chip (SoC) containing multiple processing cores. As shown, an example SoC debugging system 100 according to the present invention includes a host system 110 that is interfaced to an evaluation setup 120, where the evaluation setup 120 includes an SoC 200 for evaluation that communicates with a host agent 1400, both of which contain aspects of the present invention. In the example SoC debugging system 100, the host system 110 can be any type of computer (e.g., personal, mainframe, mini, networked, workstation, etc.) running host software that allows a user to target one or more processing cores on the SoC 200 for debugging, and to specify triggering parameters for tracing the processing cores. The host agent 1400 converts the host software instructions into appropriate signals for properly configuring the SoC 200. Once properly configured through the host agent 1400, the SoC 200 is put into operation. As triggering parameters are fully satisfied, processing cores can be simultaneously traced in real-time. The trace data are stored internally on the SoC 200 until all tracing desired is completed. Upon trace completion, the host agent 1400 retrieves the trace data and converts the data into a host agent 1400 useable format. The host agent 1400 software then accurately manipulates the data for further play-back and processing by the user. Note that, alternatively, the host agent 1400 can be an integral part of and run on the SoC by using one of the SoC processing cores to run the host agent 1400 software for the remaining processing cores.

While FIG. 1 shows the host system 110 as a single unit, this is not necessary for the present invention. The host system 110 can also be divided into more than one unit, for example, wherein one unit provides a user interface, and one or more units provide data translation from the host agent 1400 to the user interface unit. If the host system 110 is divided, the separate units could communicate using a TCP/IP connection, for example, or any similar communication technique. Also, the separate units could be hardware, software, or a combination of hardware and software. Other possible ways of dividing the host system 110 into more than one unit is and should be considered further examples of the present invention.

Figure 2:
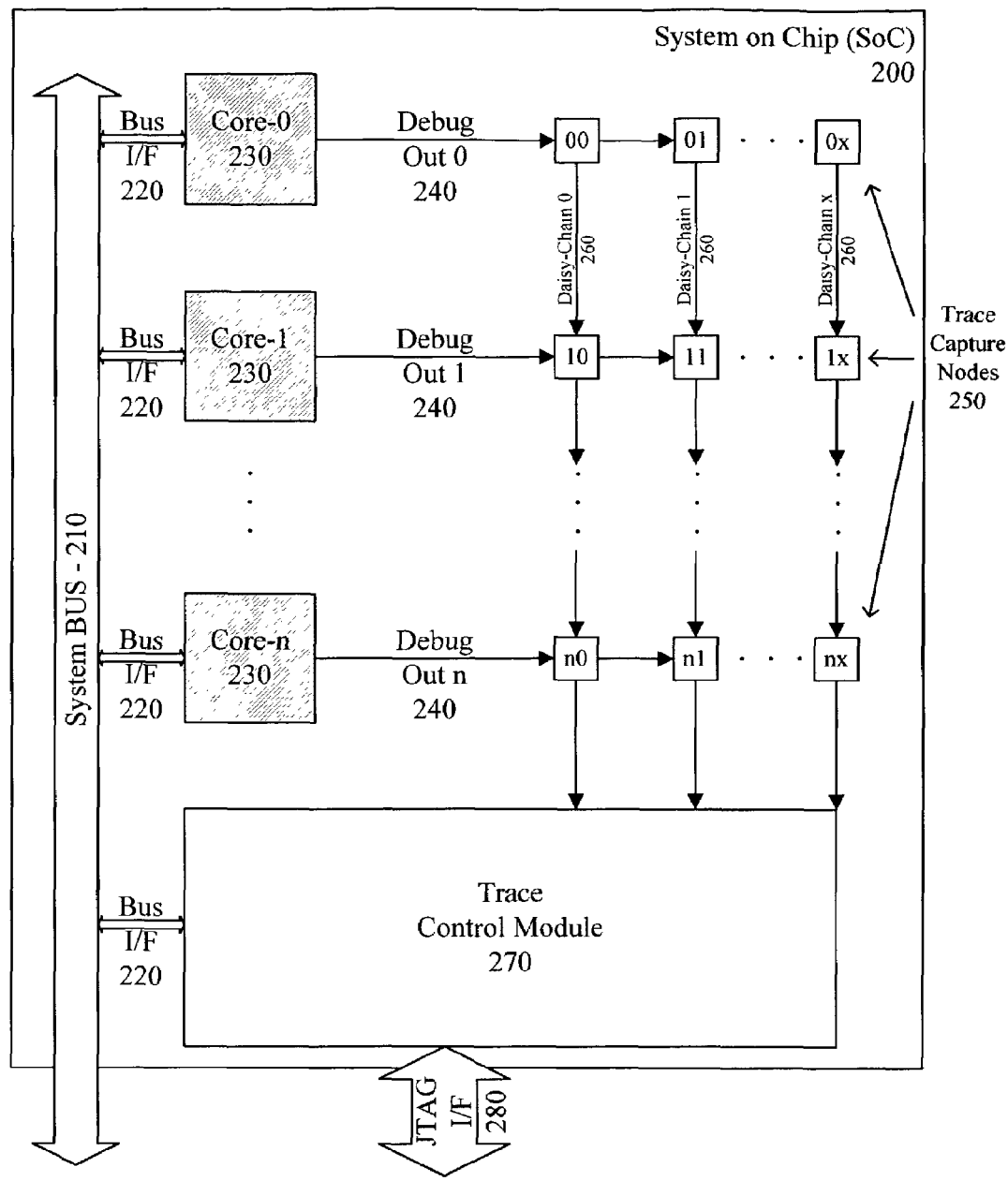
FIG. 2 shows an SoC of the trace and debug system of the present invention.

FIG. 2 shows an SoC 200 of a presently preferred embodiment of the present invention. As shown, the example SoC 200 according to the invention includes an arbitrary number, n+1, of processing cores 230, each processing core containing a debug out bus 240 that is connected to a number, x+1, of trace capture nodes 250, the trace capture nodes being connected together forming x+1 daisy-chain buses 260 that terminate at a trace control module 270. Additionally, the processing cores 230 might communicate off-chip using a system bus 210 via a system bus interfaces 220. The trace control module 270 can also communicate off-chip using a system bus 210, as well as through a JTAG interface 280.

Although FIG. 2 shows all of the processing cores 230 connected to trace capture nodes 250, this is not a requirement of the present invention. The present invention may include processing cores 230 on the SoC 200 that are not connected to a trace capture node 250. Likewise, though FIG. 2 shows all of the processing cores 230 connected to a number, x+1, of trace capture nodes 250, the present invention includes connecting each processing core to only one trace capture node 250 thereby forming only one daisy-chain bus 260. Also, it should be noted that additional components and circuitry units (i.e., non-processing core units) can be included on the SoC 200 of the invention, but are not necessary for the invention. Therefore, such additional components and circuitry units are not depicted or discussed so as not to obscure the present invention.

An aspect of a preferred embodiment of the present invention is that each processing core 230 to be traced produces a trace output format that is passed in real-time via the debug out bus 240 to one or more trace capture nodes 250 with which it is associated. Table 1, below, shows one example of a 77-bit processing core trace output format.

Note that in Table 1, bits 76, 75:70 and 63:32 provide processing core data information, while bits 69:64 and 31:0 provide processing core address information.

TABLE 1

| Bit Position | Interpretation of Bit-field |
|---|---|
| 76 | 1 bit, data info, representing a valid write to the register |
| 75:70 | 6 bits, data info, representing the destination register number |
| 69:64 | 6 bits, address info, representing the processing core status |
| 63:32 | 32 bits, data info, representing the destination register value |
| 31:0 | 32 bits, address info, representing the current address or program counter |

Figure 3:
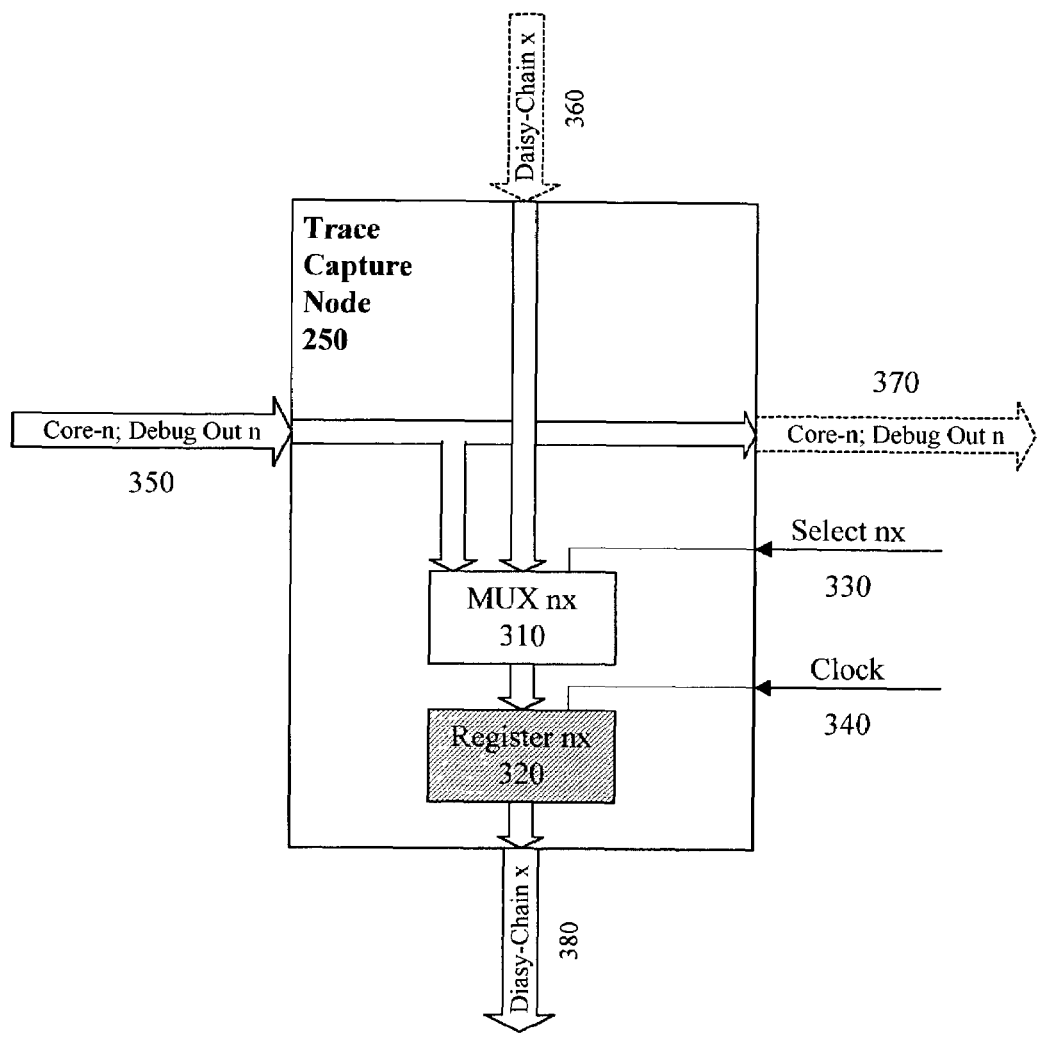
FIG. 3 shows a trace capture node of the SoC.

FIG. 3 shows a trace capture node 250 of a presently preferred embodiment in more detail. As shown, the example trace capture node 250 of the invention contains a multiplexer 310 and a register 320. The trace capture node 250 also has a select 330 control input and a clock 340 timing input. In one example, the select input 330 originates from the trace control module, while the clock input 340 can be a system level clock signal. Additionally, the example trace capture node 250 includes two trace data inputs 350, 360 and two trace data outputs 370, 380, all of which are the width of the processing core trace output format. One trace data input-output pair 350, 370 provides a way of passing processing core trace data to and between trace capture nodes 250. The first trace capture node 250 connected in a sequence of trace capture nodes 250 (i.e., one associated with daisy-chain bus 0) has its trace data input 350 connected to the processing core debug out bus to which that sequence of trace capture nodes 250 is directly associated. Each trace capture node 250 that is connected to another trace capture node 250 in a sequence of trace capture nodes 250 has its trace data output 370 connected to a subsequent trace capture node 250 trace data input 350. The trace data output 370 of the last trace capture node 250 in a sequence of trace capture nodes 250 (i.e., one associated with daisy-chain bus x) will not be connected to another trace capture node 250.

The other trace data input-output pair 360, 380 of this example trace capture node 250 passes trace data along the daisy-chain bus in which that trace capture node 250 is connected. The top trace capture node 250 of a daisy-chain bus (i.e., one associated with processing core 0) does not have its trace data input 360 connected to another trace capture node 250. Each trace capture node 250 connected to another trace capture node 250 in a daisy-chain bus has its trace data output 380 connected to a subsequent trace capture node 250 trace data input 360. The trace data output 380 of the bottom trace capture node 250 of a daisy-chain (i.e., one associated with processing core n) bus will be connected to the trace control module.

As additionally shown in FIG. 2, this example of the trace capture node 120 contains register 320 that is as wide as the processing core trace output format (e.g., 77-bits in the example provided in Table 1). The output of the register 320 is a trace data output 380 of the trace capture node 250. Connected to the input of the register 320 is the output of multiplexer 310. The multiplexer 310 is capable of selectively outputting to the register 320 either of the trace data inputs 350, 360. The selection of which input the multiplexer 310 will output to the registers 320 comes from the select input signal 330. In this way, any trace capture node 250 can multiplex in to any daisy-chain bus the processing core trace data to which it is directly associated. Further, when using a number, x+1, of daisy-chains in an SoC containing an arbitrary number, n+1, of processing cores, x+1 out of n+1 processing cores can simultaneously be traced.

As shown in FIG. 2 and discussed above, processing core 230 trace data are transferred within the SoC 200 to the trace control module 270 using a number, x+1, of daisy-chain buses 260. In a preferred embodiment of the present invention, the number of daisy-chain buses 260 used within the SoC is equal to the number of processing cores 230 that might need tracing during the debug process, as determined by the SoC designer. The daisy-chain buses 260 provide the ability to collect any trace data from any processing core 230 without taking up undo chip area routing each processing core trace data external to the SoC 200. In this manner, the daisy-chain buses 260 facilitate the simultaneous, real-time tracing of multiple processing cores 230. However, due to the multiplexing and registering of trace data within each daisy-chain bus 260 at each trace capture node 250, different processing core trace data may reach the trace control module 270 at different times. This can produce data latencies between traced processing cores. However, the topology of which processing cores 230 are connected to which trace capture nodes 250 and how each trace capture node 250 is configured within each daisy-chain bus 260 is known by the SoC 200 designer, and so these topologies can be made known to the host system software, which in turn can account for the latencies when comparing and debugging multiple processing core trace data.

Figure 4:
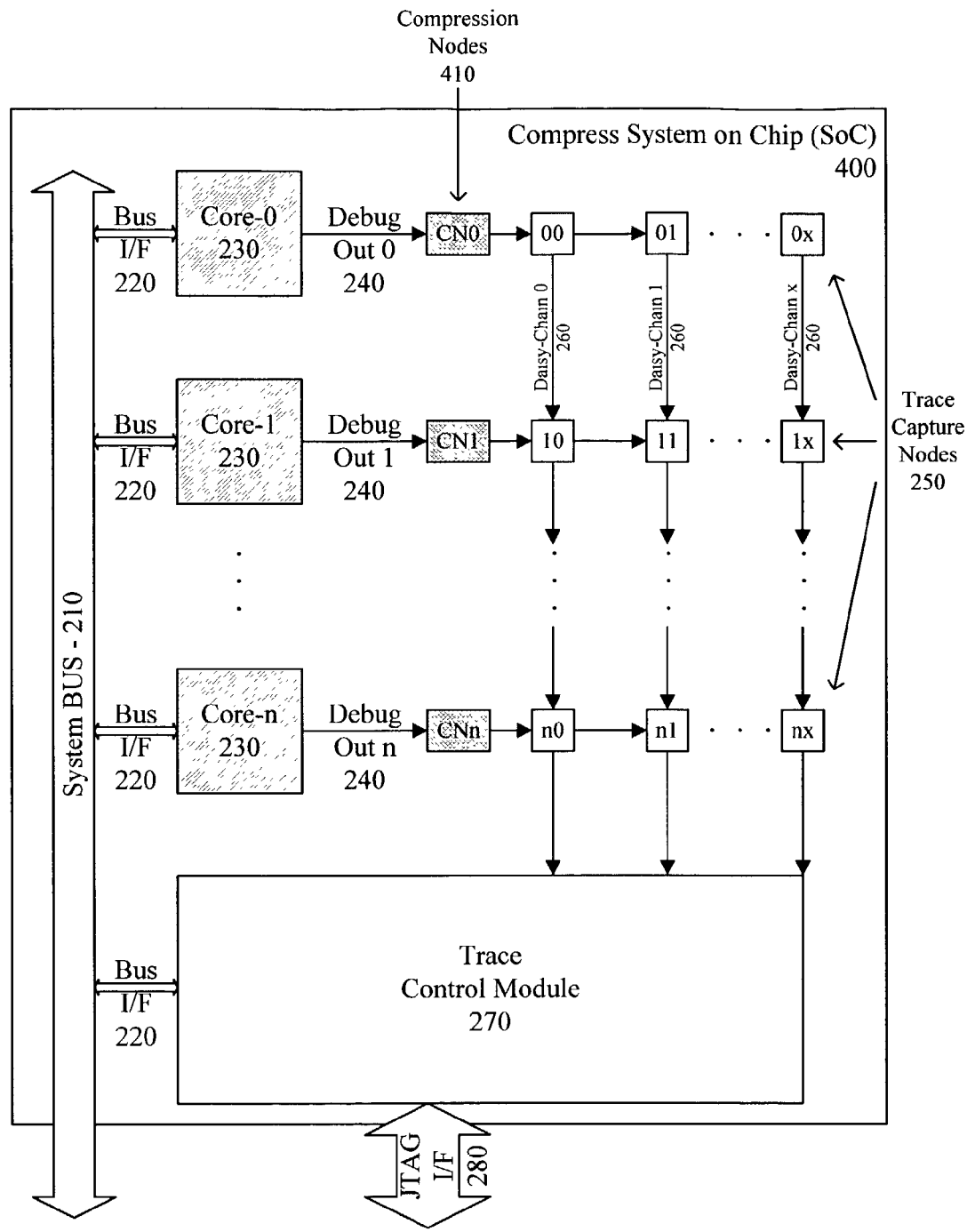
FIG. 4 shows a compression SoC of the trace and debug system of the invention.

Another aspect of the present invention is the ability to compress the processing core trace data prior to passing this data to a daisy-chain bus. There are two examples of this aspect herein illustrated. The first illustration of this aspect, FIG. 4, is a compress system on a chip 400. As shown in this example, the compress system on a chip 400 is similar to SoC 200 except that it further includes compression nodes 410. The compression nodes 410 are inserted into the previously described SoC between each debug out bus 240 and the first trace capture node 250 in a sequence of trace capture nodes 250. The compression nodes take the processing core trace data as input, perform data compression on the trace (discussed in detail below), and pass the compressed trace data to the trace capture node. The trace capture nodes 250 and daisy-chain buses 260 are as previously described, except the width of the data handling components can be lessened to match the width of the compressed trace data coming out of the compression nodes 410. The compressed trace data leaving the daisy-chain buses 260 at the trace control module 270 will require decompression prior to analysis by a user. One place this decompress logic can be added is the trace control module, as discussed in more detail below.

Figure 5:
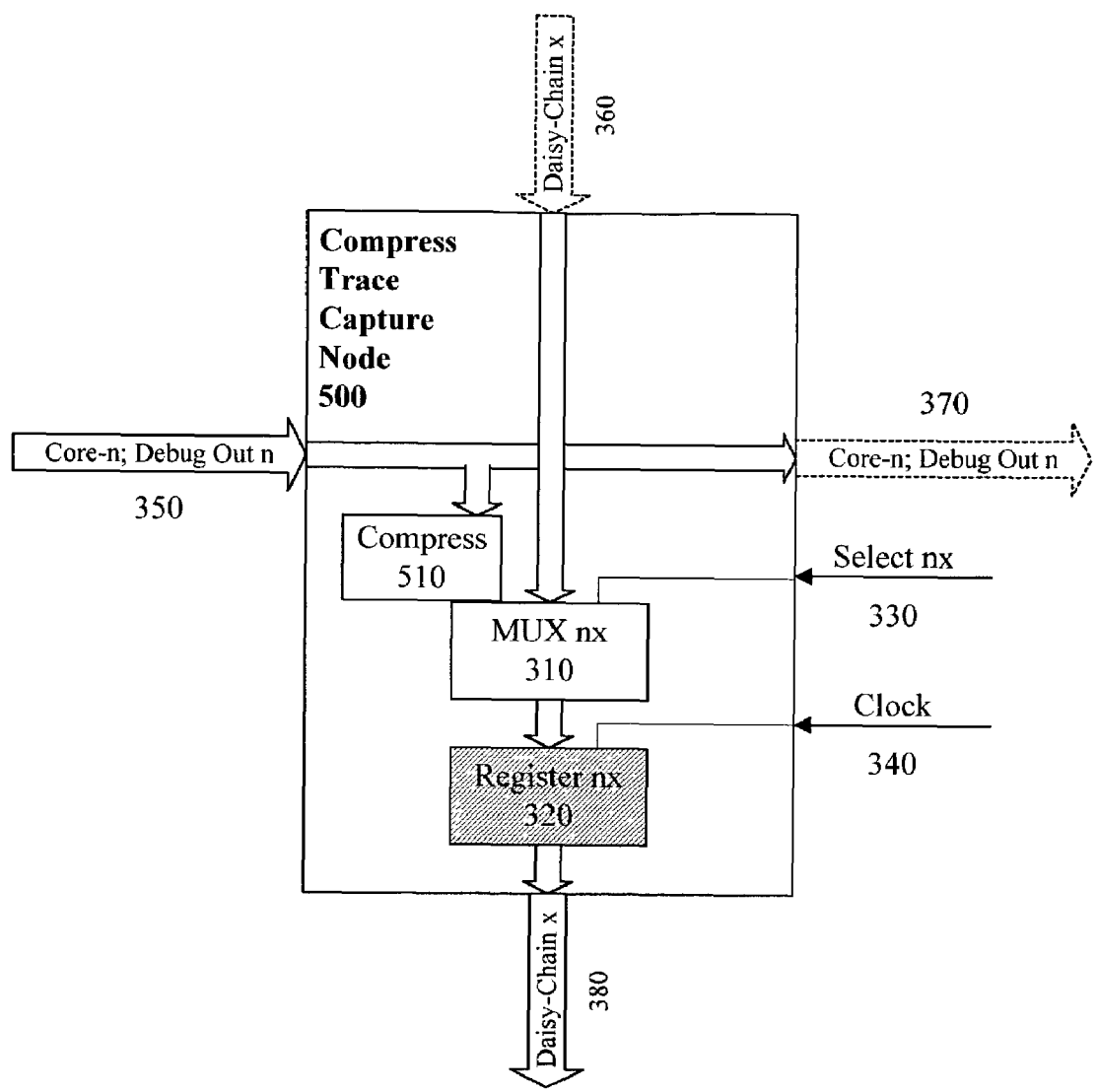
FIG. 5 shows a compression trace capture node of the SoC.

The second illustration of this compression aspect, FIG. 5, is a compress trace capture node 500 of the present invention. As shown, this example of a compress trace capture node 500 of the invention is similar to the previously discussed trace capture node 250. However, the compress trace capture node 500 is different in design in two main ways. First, only one trace data input 350 and output 370 of the compress trace capture node 500 is the width of the processing core trace output format. The other trace data input 360 and output 380 can be a smaller width; and thus, the daisy-chain bus in which the compress trace capture node 500 is connected can also be this smaller width. Second, internal compress logic 510 is added to the compress trace capture node 500 to take the full-width processing core trace data from the trace data input 350 and compress it into fewer bits prior to multiplexing (discussed in detail below). The compress logic 510 outputs the compressed trace data to the multiplexer 310. Then, the multiplexer 310 and register 320 perform the same functions in the same manner as in the previously discussed trace capture node 250.

Generally, a compress trace capture node 500 can be used in place of any trace capture node previously discussed, with one limitation. If one compress trace capture node 500 is used within a particular daisy-chain bus, then that entire daisy-chain bus should be made up of compress trace capture nodes 500 to allow that daisy-chain bus to benefit from the smaller data width exiting the compress trace capture node 500 trace data output 380. Thus, it is possible for a subset of the total number of daisy-chain buses to use compressed trace data, with the remaining daisy-chain buses using full-width trace data. Additionally, if a compress trace capture node 500 is used, then decompress logic must be used prior to data analysis by a user. One place this decompress logic can be added is the trace control module, as discussed in more detail below.

In both FIG. 4 and FIG. 5, the compression of the processing core trace data can be accomplished by similar methods. In general, compression of the trace data can be, and have been, done in a variety of different ways. From taking advantage of locality of reference in the addresses in the trace, to assuming that the program store is uncorrupted and only tracing branches, there are many existing techniques to do this (e.g., program counter incrementing, run-length encoding, bubble filtering, etc.). While connecting the compress trace capture nodes in a daisy-chain lowers the physical design problems associated with layout of the present invention, adding the compression nodes at the processing cores can lower the bandwidth requirements from the processing cores to the trace control module.

Figure 6:
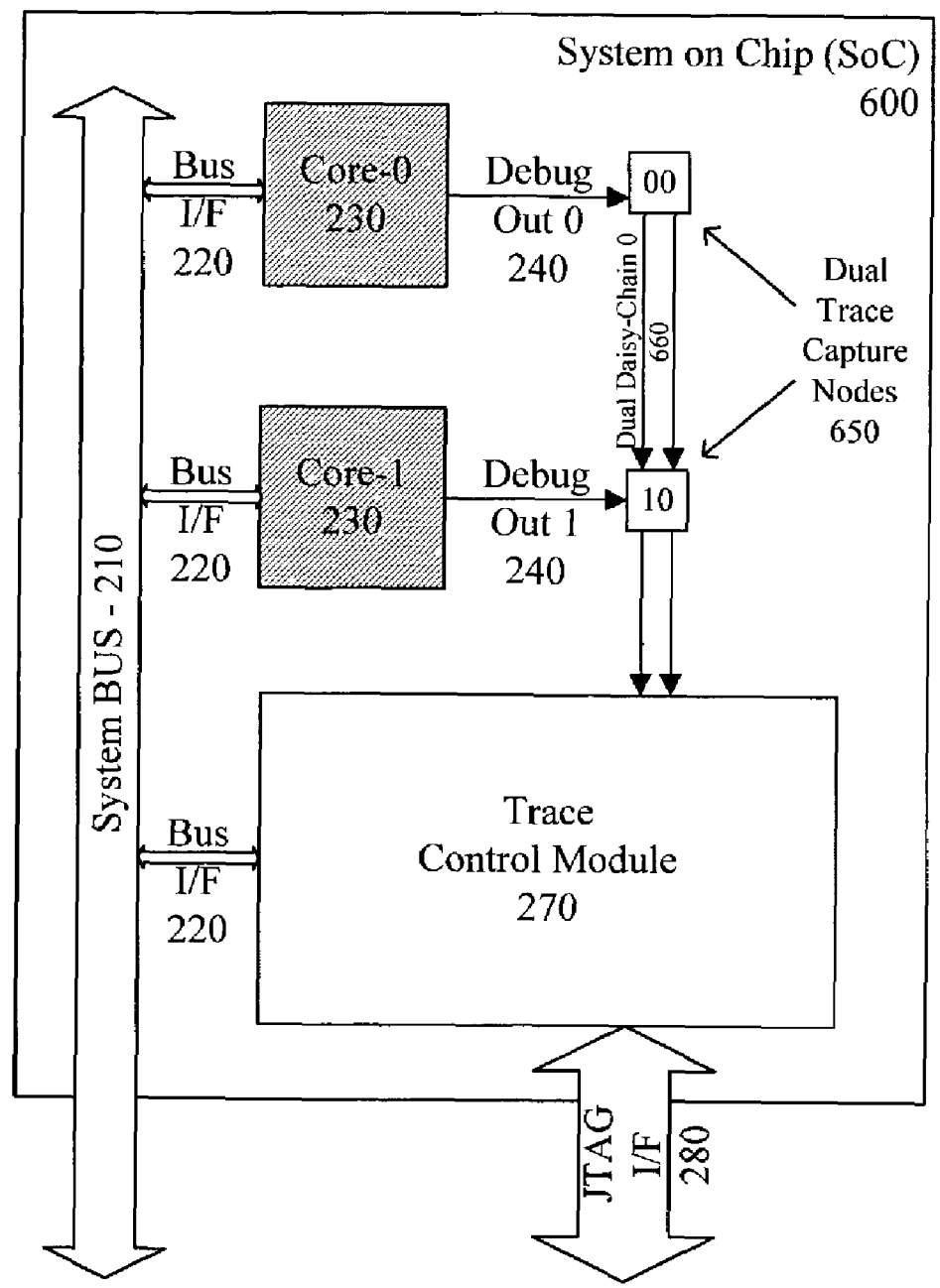
FIG. 6 shows an alternate SoC of the trace and debug system of the present invention.
Figure 7:
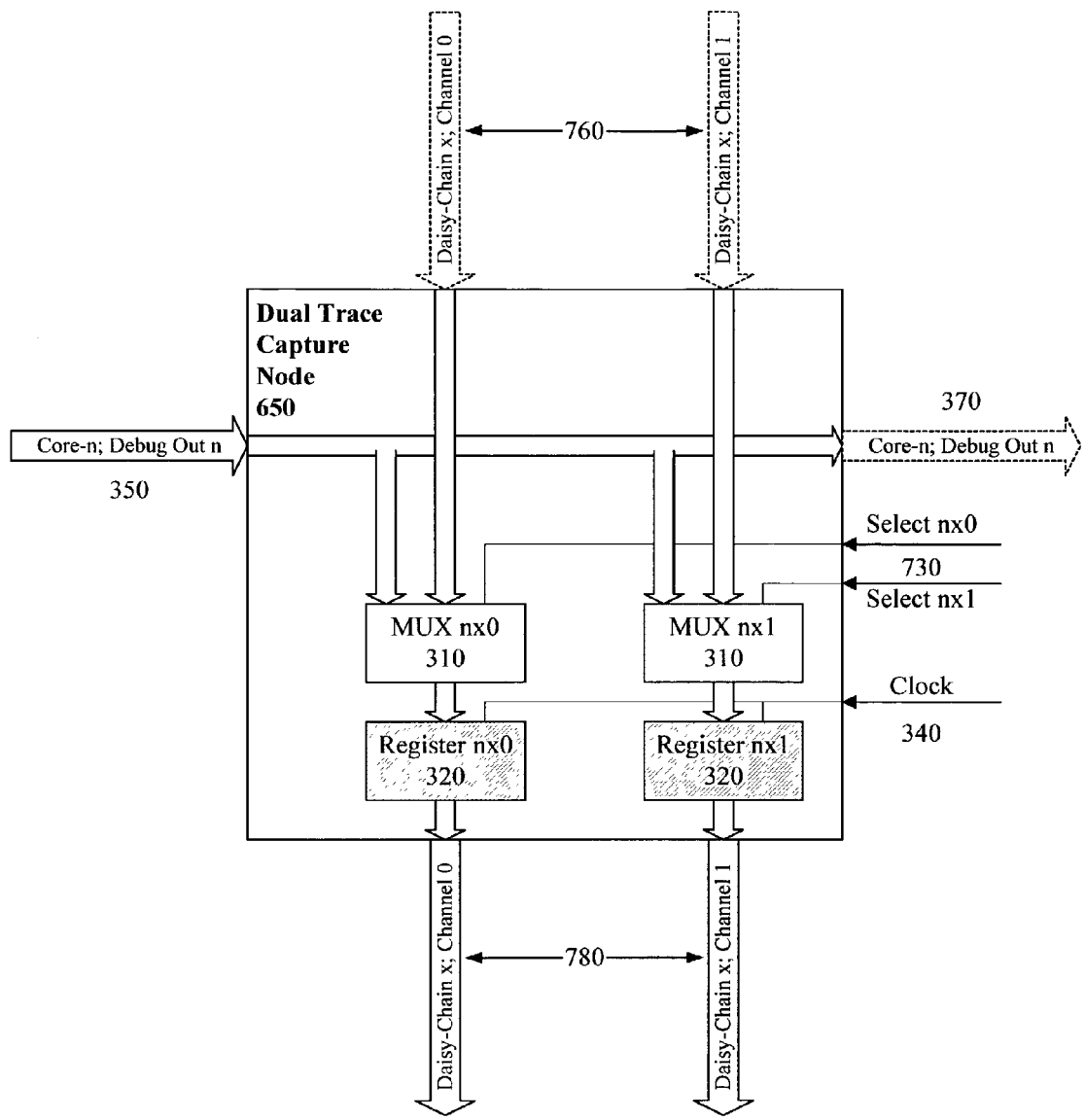
FIG. 7 shows an alternate trace capture node of the alternate SoC.

FIG. 6 is an SoC 600 using a dual trace capture node 650 of another embodiment of the present invention. As shown in this example, the dual trace capture node 650 allows for two processing cores 230 to be connected into a single dual-channel daisy-chain bus 660. FIG. 7 shows the details of a dual trace capture node 650 of this example of the present invention. As shown in FIG. 7, the dual trace capture node 650 includes the functionality of two of the previously described trace capture nodes. Thus, the dual trace capture node 650 contains two multiplexers 310, two registers 320, a dual select input 730, a two-channel daisy-chain input-output pair 760, 780. The components of the dual trace capture node 650 function as previously described. From this expansion of the trace capture node into the dual trace capture node, it will be evident to those skilled in the art how to further expand the trace capture node. Likewise, it will now be evident to those skilled in the art that numerous dual channel trace capture nodes can be connected sequentially to form multiple dual-channel daisy-chain buses. Finally, from the previous trace data compression disclosure, it will be evident to those skilled in the art that the dual channel trace capture node can include compression logic or can be combined with SoC compression nodes.

Figure 8:
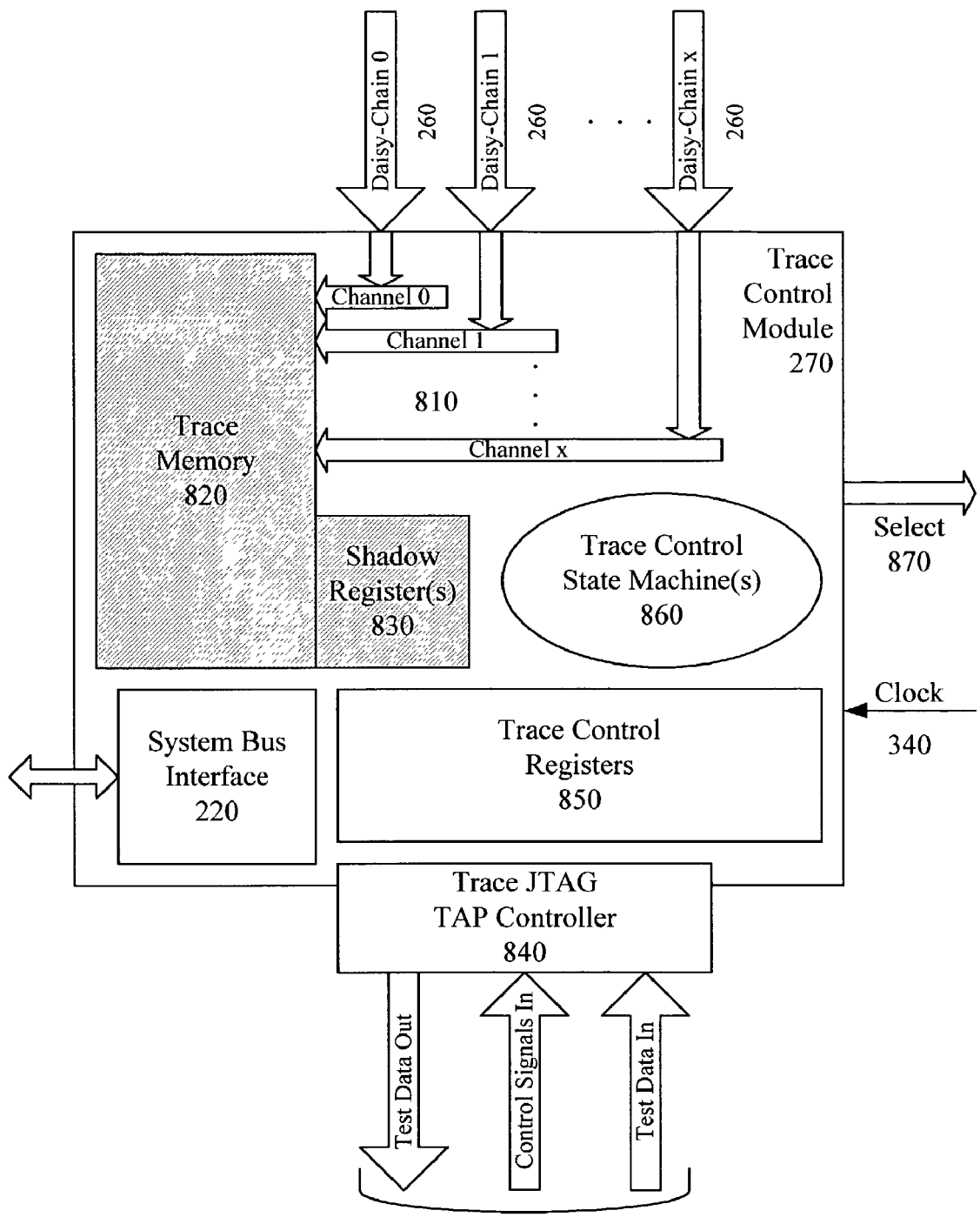
FIG. 8 shows a trace control module of the SoC.

FIG. 8 shows the trace control module 270 of a preferred embodiment of the present invention, which provides for off-chip control and interface, and on-chip interface, control and storage of processing core trace data. As shown, the example trace control module 270 of the invention includes a multi-channel internal trace data bus 810, trace data memory 820, shadow register(s) 830, a system bus interface 220, a JTAG TAP controller 840, trace control registers 850, trace control state machine(s) 860, select control output(s) 870, and, a system clock input 340. The internal trace data bus 810 transfers processing core trace data from the terminating daisy-chain buses 260 to the trace memory 820 and shadow register 830. The system bus interface 220 and JTAG TAP controller 840 facilitate internal and external SoC communication, including the transfer of trace data off the SoC and trace configuration-control data onto the SoC. The trace control registers 850 store the trace configuration-control data for the SoC. The trace control state machine(s) 860 provides the logic for triggering when trace samples should be taken, from which processing core(s) the data should be taken and when completed trace samples can be transferred off the SoC. Last, the trace control module 270 produces select output(s) 870 connected to the trace capture node(s) that control which processing core trace data is multiplexed into which daisy-chain bus 260, and a system clock input 340 for timing purposes.

The trace control module 270 of FIG. 8 communicates on and off the SoC using the system bus and its corresponding system bus interface 220, and the JTAG TAP interface 280 and its corresponding JTAG TAP controller 840. The system bus interface 220 is a simple SRAM-like memory interface. This connection allows the SoC to send and receive control and trace data to and from other devices on the SoC, as well as to and from devices externally connected to the system bus. The JTAG TAP controller 840 of the trace control module 270 conforms to the IEEE 1149.1 JTAG specification. The JTAG TAP controller 840 is brought out to pins on the SoC for interface with and control by an external host agent through the JTAG interface 280. Although the use of JTAG communication is preferred, other interfaces are possible.

Figure 9:
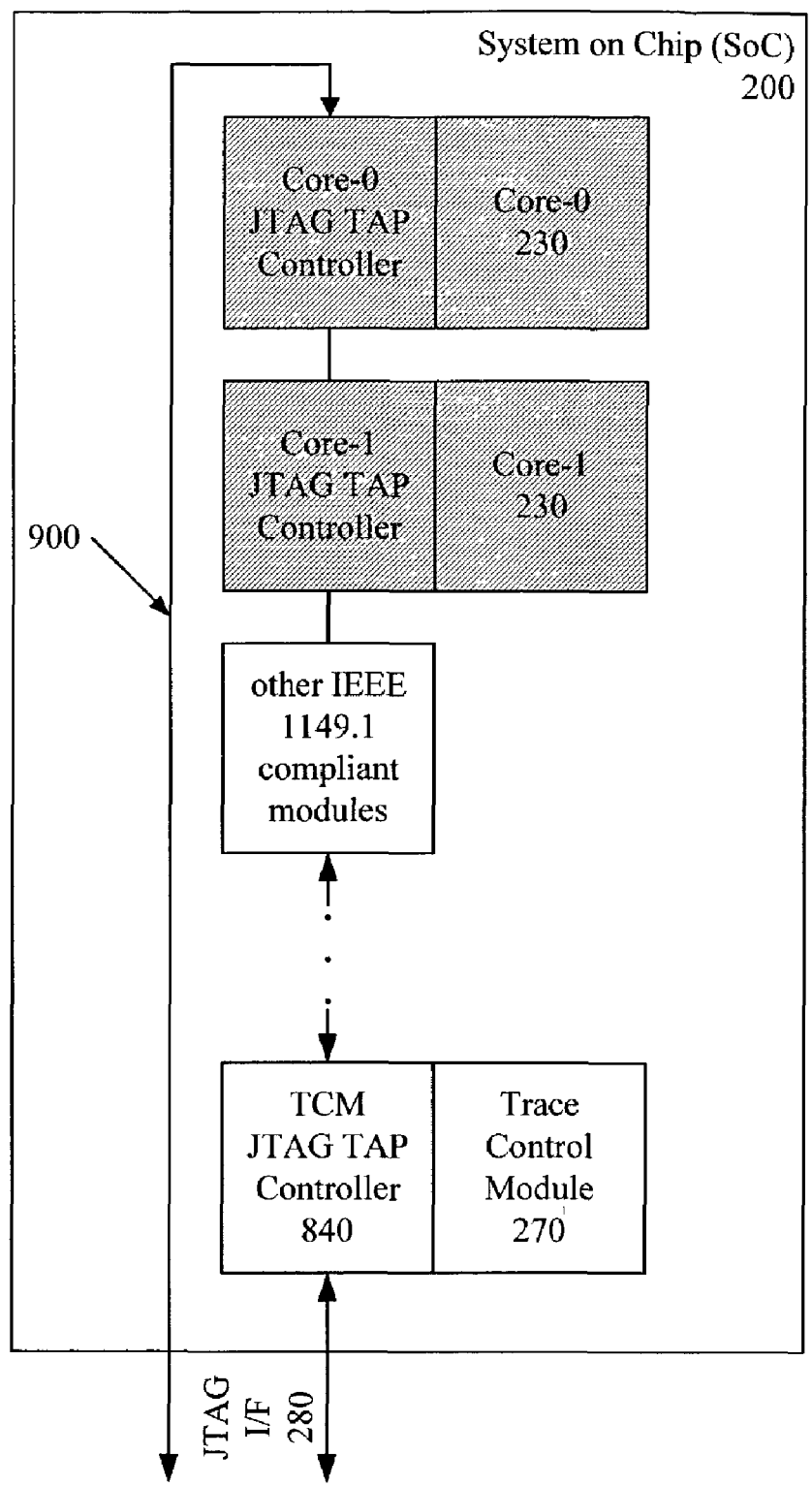
FIG. 9 shows a JTAG device chain of the SoC.

FIG. 9 is an alternate configuration for the TAP controller 840 of the trace control module 270. As shown, the TAP controller 840 of the trace control module 270 in this embodiment of the present invention is part of a JTAG chain 900. It can be on the JTAG chain 900 by itself or on the chain with other JTAG enabled devices, including processing cores 230. In the co-pending U.S. patent application Ser. No. 09/680,126 to Newlin et al., an invention is described that handles multiple configurable microprocessors on a JTAG chain. The present invention extends this to include handling the trace control module 270 TAP controller 840 on a JTAG chain. The JTAG chain 900 is brought out to pins on the SoC for interface with and control by an external host agent through the JTAG interface 280.

Referring back to FIG. 8, the shadow register(s) 830 of the trace control module 270 provide a snap-shot of a traced processing core's main register file just prior to the trace data sampling period beginning. A captured trace can begin billions of cycles after the processing core has been executing. Thus, the information in a captured trace may be difficult to interpret without knowing the state of the processing core immediately prior to the captured trace data. The shadow register(s) 830 provides this information.

In a preferred embodiment of the present invention, the shadow register 830 of FIG. 8 is a memory location that is equal in width to the widest main register file of all the processing cores on the SoC that are connected to a daisy-chain bus 260. The memory location of the shadow register 830 is also equal in depth to the deepest main register file of all the processing cores on the SoC that are connected to a daisy-chain bus 260. The state of the target processing core's main register file is continually transferred to, and updated in, the shadow register 830 via the daisy-chain bus 260 selected for that processing core. Under the control of the trace control state machine 860 (discussed in more detail below), the shadow register 830 thus maintains a complete copy of the state of a selected processing core's main register file from the time that processing core is reset until the time immediately prior to the trace memory 820 actually storing trace data.

The information to update the shadow register 830 is contained in subfields of the selected processing core's trace data. In the example from Table 1, above, the trace data are encoded with three pertinent subfields. The first is a subfield containing the actual data written to the processing core's internal main register file during that cycle. The second is the index into that processing core's main register file where that actual data was stored. The third subfield, a single bit, is a validity signal indicating that a write to the processing core's main register file did indeed occur. Note that the shadow register 860 is only fully useful when the trace data contains these subfields because the shadow register archives known values of the processing cores' registers for the oldest stored trace data in trace memory.

Still referencing FIG. 8, processing core trace data enters the trace control module via one or more daisy-chain buses 260, each of which terminate at the internal trace data bus 810. The internal trace data bus 810 provides the interface between each daisy-chain bus 260 and the trace memory 820 of the trace control module 270. In this example, the internal trace data bus 810 contains one bus channel for each daisy-chain bus 260. The trace memory 820 provides for the internal storage of trace data on the SoC. The trace memory 820 is written to in a circular, or wrap-around, fashion. For example, once stored trace data completely fills the trace memory 820 (i.e., the most recently stored trace data will be at the end, or last address, of the trace memory), new trace data is stored by overwriting the oldest stored trace data at the start, or first address, of the trace memory 820. In this way, the trace memory 820 can be thought of as a circular continuum with the last memory address connected to the first memory address.

Figure 10:
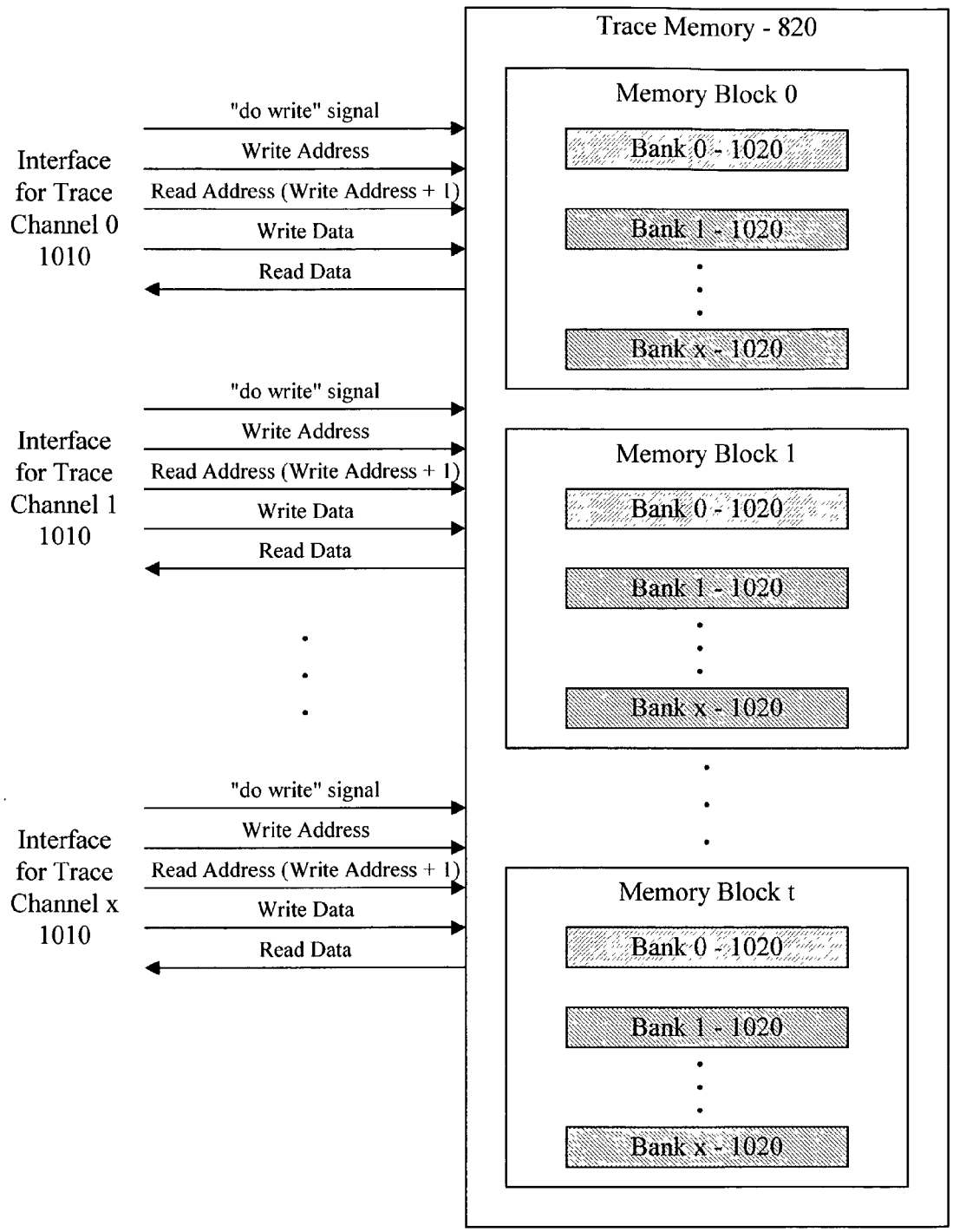
FIG. 10 shows a trace memory layout of the SoC.

Additionally, as a result of the wrap-around storage convention of the trace memory 820, all trace data to be overwritten during a sampling period are first written to the shadow register 830 to update the traced processing core's register contents. This is accomplished by using multiple channels of input data and segmenting the trace memory 820 into a number of separate memory banks, each with separate interface channels to the multiple input data channels. FIG. 10 shows the segmented characteristic of the trace memory 820, with a number of separate memory banks 1020 and multiple data channels 1010 corresponding to each of the channels of the internal trace data bus. The trace memory 820 toggles write address locations between memory banks 1020. Also, during an overwrite to the trace memory 1020 because of wrap-around, the corresponding read address for that clock cycle is one location ahead of the write address. In this way, the trace memory 1020 can handle a read and a write during every clock cycle, which is needed for trace memory 1020 wrap-around. Therefore, the shadow register can be updated during a clock cycle with the memory bank 1020 data that is set to be overwritten during the next clock cycle.

Figure 11:
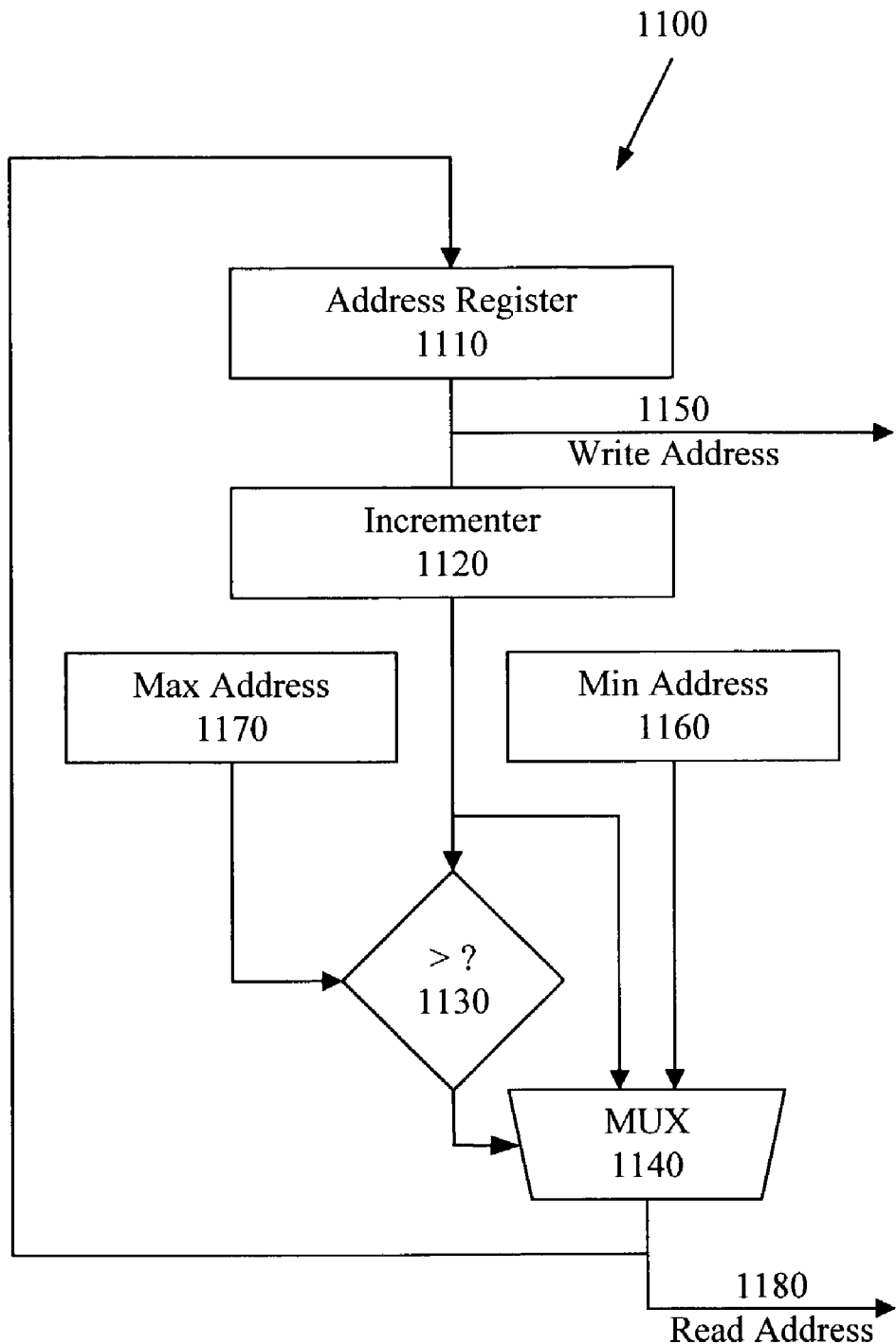
FIG. 11 shows an address generation logic for the trace memory of the SoC.
Figure 12:
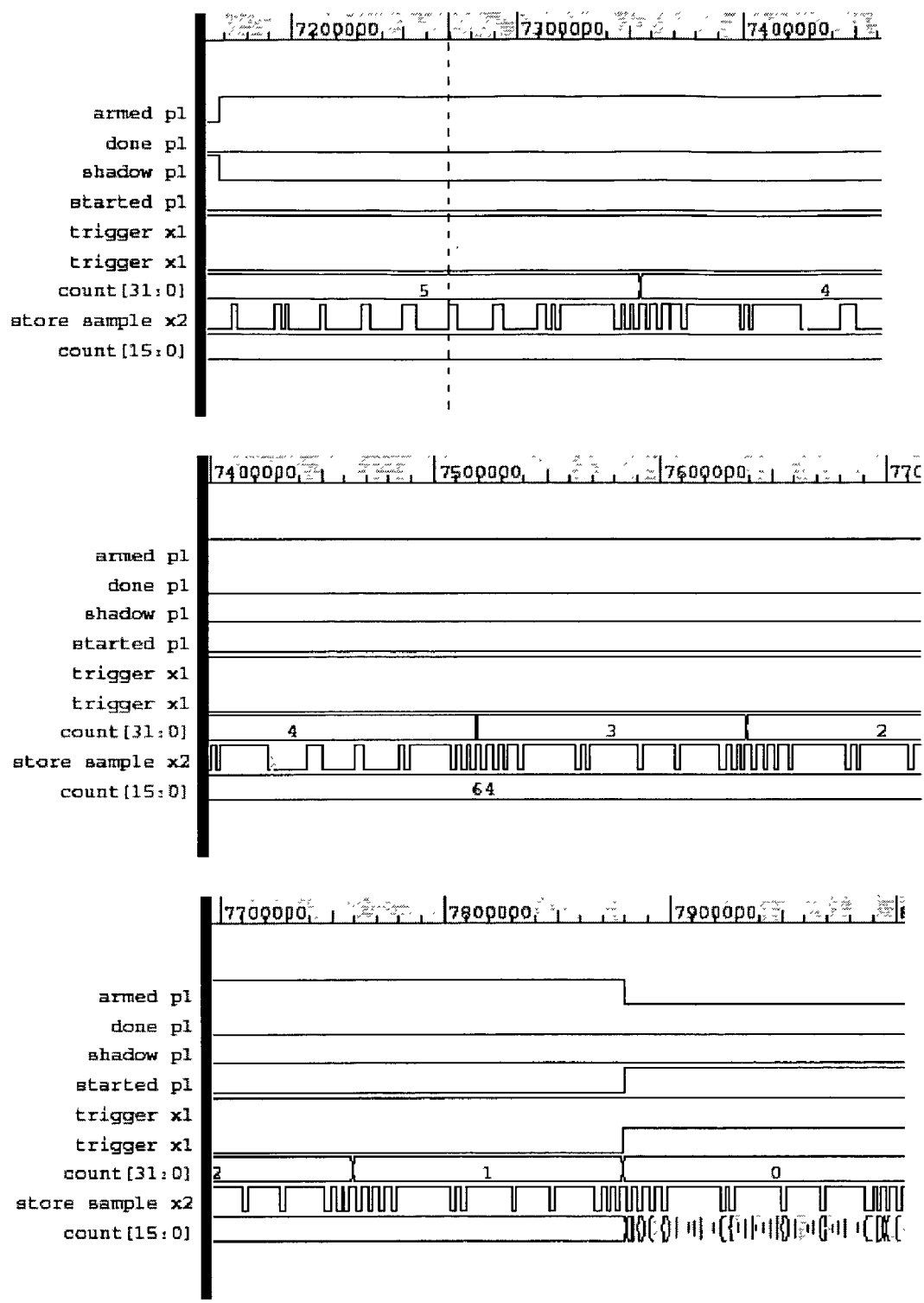
FIG. 12 shows an example trace timing diagram output for the SoC.

FIG. 11 shows the address generation logic 1100 for the multiple bank trace memory configuration of the present invention. As shown, this example address generation logic includes an address register 1110, an incrementer 1120, a comparator 1130, and a multiplexer 1140. The address register 1110 contains the last address from which trace data were read and the next address to which trace data will be written. First, the write address 1150 is taken from the address register 1110. Then, the incrementer 1120 increments the address from the address register 1110 by one location and passes this incremented address to the comparator 1130 and to the first data input of the multiplexer 1140. The second data input of the multiplexer 1140 is the min address 1160 of the trace memory. The comparator 1130 checks the incremented address against the max address 1170 of the trace memory to see if the incremented address is beyond the writable address limit of the trace memory. The comparator 1130 result is sent to the select input of the multiplexer 1140. If the incremented address is greater than the max address 1170, then the comparator 1130 outputs a signal to select the min address 1160 for the output of the multiplexer 1140 (i.e., wrap-around of the trace memory occurs). Otherwise, the comparator 1130 outputs a signal to select the incremented address as the output of the multiplexer 1140. The multiplexer 1140 output is used as the read address 1180 and also to update the address register 1110 for the next write. Since the read address 1180 is always guaranteed to be one location ahead of the write address 1150, memory bank conflicts are guaranteed not to occur.

Referring back to the example of FIG. 8, communication with the trace control registers 850 in a preferred embodiment of the invention is through one of two different mechanisms. The trace control module 270 has a memory mapping of all the trace control registers 850 and can be hooked up to the SoC system bus using its system bus interface 220. There is also a JTAG TAP controller 840 associated with the trace control module 270 that interfaces to all of the trace control registers 850. The TAP controller 840 has address and data registers. The address register uses the same offsets that the system bus interface 220 uses for trace control register 850 mapping. To read or write trace control register 850 data via the JTAG interface 280, the TAP controller's address register must be first initialized. To read from the address that was placed into the TAP controller's address register a special TAP command (see Table 2, below) is downloaded that copies the contents of the associated trace control register 850 into a TAP controller data register. The TAP controller data register value can then be scanned out using the JTAG interface 280. Writing to a trace control register 850 is done in the same manner. TAP controller address register and data register values are scanned into the TAP controller 840 using the JTAG interface 280, and then a TAP command is issued to perform a write operation, which copies the TAP controller data register value into the appropriate trace control register 850.

As previously mentioned in the example of FIG. 8, the trace control state machine 860 controls the internal operation of the trace control module 270. Specifically, the trace control state machine 860 determines when the shadow register 830 tracks a selected processing core's internal main register file, when that processing core's trace data are stored in the trace memory 820, and when the trace control module 270 can accept set-up data or off-load stored trace data. Generally, but discussed in more detail below, the logic for the trace control state machine 860 is as follows: starting at reset, or some other time when the status of a target processing core's main register file is fully known, the trace control state machine 860 directs the shadow register 830 to track the target processing core's main register file. When the trace control state machine 860 fully triggers and capture of trace data is to begin, the shadow register 830 is directed to stop updating and the trace memory 820 is directed to begin storing trace data. As the trace memory 820 fills, the capture of trace data stored in the trace memory 820 may wrap-around and overwrite previously stored samples. If wrap-around occurs, the trace control state machine 860 directs the shadow register 830 to update its contents with the values from each overwritten trace sample. Finally, the trace control state machine 860 determines when the sampling of trace data is complete and facilitates transfer of the stored trace data out of the trace memory 820 and off the SoC.

The trace control state machine 860 utilizes data contained in the trace control registers 850 of the trace control module 270 to control the triggering of a debug trace. Triggering is the moment at which the capture of trace data is logically started, although, actual trace capture may start before triggering. Because the size of the trace memory 820 is limited, and because a user may not want to sift through a large quantity of extraneous data before finding the traced processing core event of interest, the trace control state machine 860 provides for entry of a specific set of criteria that must be in place or must occur before triggering occurs.

The trace control state machine 860 of the example in FIG. 8, provides several triggering levels. A triggering level can be thought of as a set of circumstances that must be met before the state machine moves on to the next triggering level. When all triggering levels' requirements have been met, storage of trace data begins. Each triggering level includes compare and mask registers of the trace control registers 850 equal to the width of the trace data coming from a processing core. By setting these compare and mask registers, the user can specify any arbitrary pattern for a triggering level to satisfy. For example, a user can first set the corresponding bits in the mask register to reflect only the trace data bits of interest, and then set the corresponding bits of the compare register to the pattern of interest.

An alternative triggering mechanism of trace control state machine 860 includes using a range mode bit along with the compare and mask registers. In this example, the trace data coming from a processing core is assumed to be segmented into various fields (i.e., virtual address field, current program counter field, etc.), and for each of those fields the trace control state machine 860 contains a range mode bit. The range mode bit, when enabled, causes the corresponding segments of the compare and mask registers to behave as low-value and high-value registers, respectively. Fields of the trace data are said to be matching when those trace data fields are between the low and high values specified in the compare and mask registers, respectively. To illustrate this, if the range mode bit is enabled and the compare register is set to 0xff and the mask register is set to 0x0, then whenever a trace data is between 0xff and 0x0 (i.e. 0xff>address>=0x0), the field is said to be matched.

Figure 15:
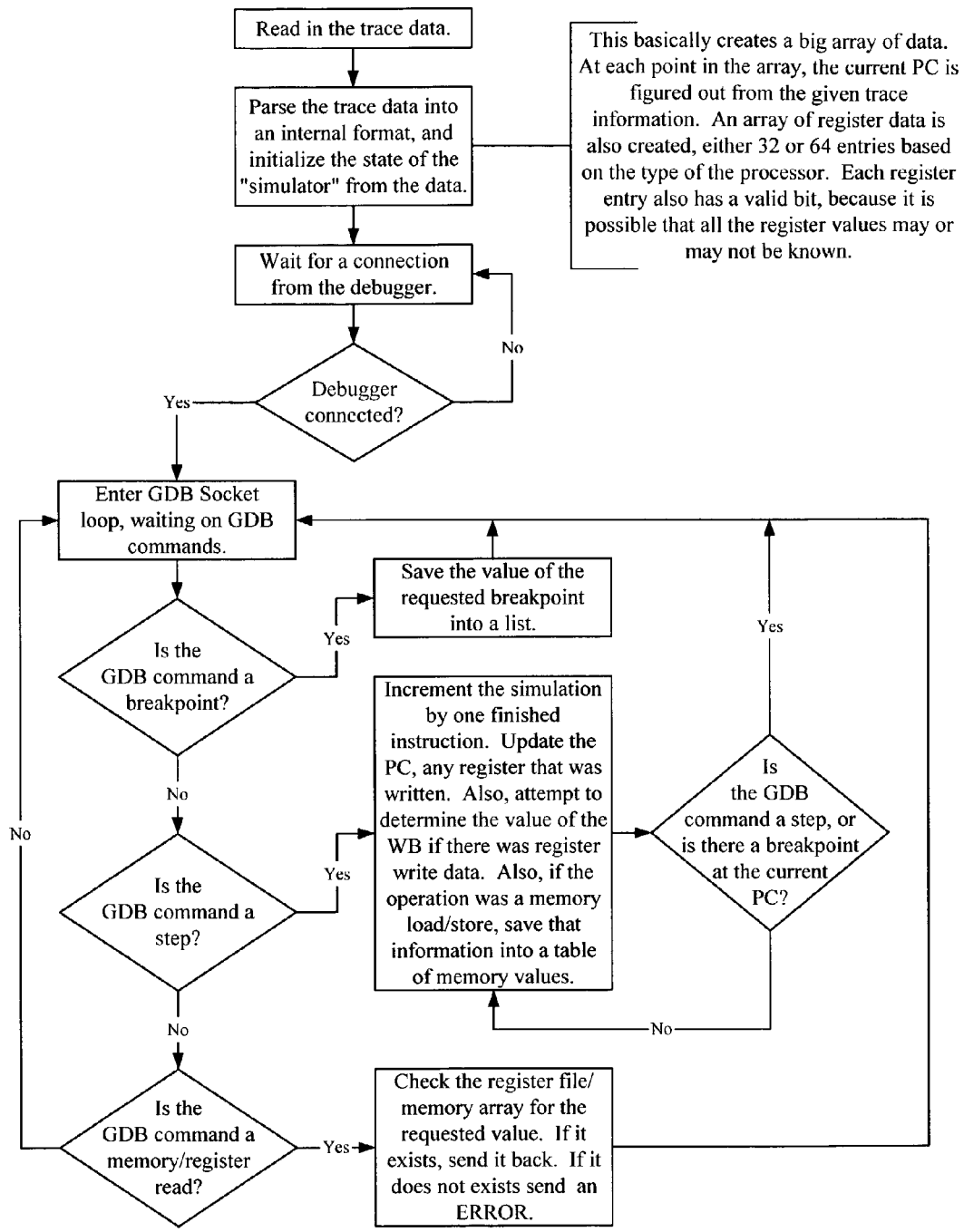
FIG. 15 shows a trace simulator flowchart of the trace and debug system.

In addition to the compare register, mask register and range mode bit, each triggering level also contains a count register that can be set to the number of cycles that the trace data must match the compare and mask register before that triggering level is passed. The timing diagram in FIG. 15 shows an example of the triggering count register decrementing from 5 to 0 once the trace data has matched. On each cycle for which the processing core's trace data matches the compare and mask registers, the count register's value is decremented by one. When the count register reaches zero, the trace control state machine 860 moves on to the next triggering level.

Figure 13:
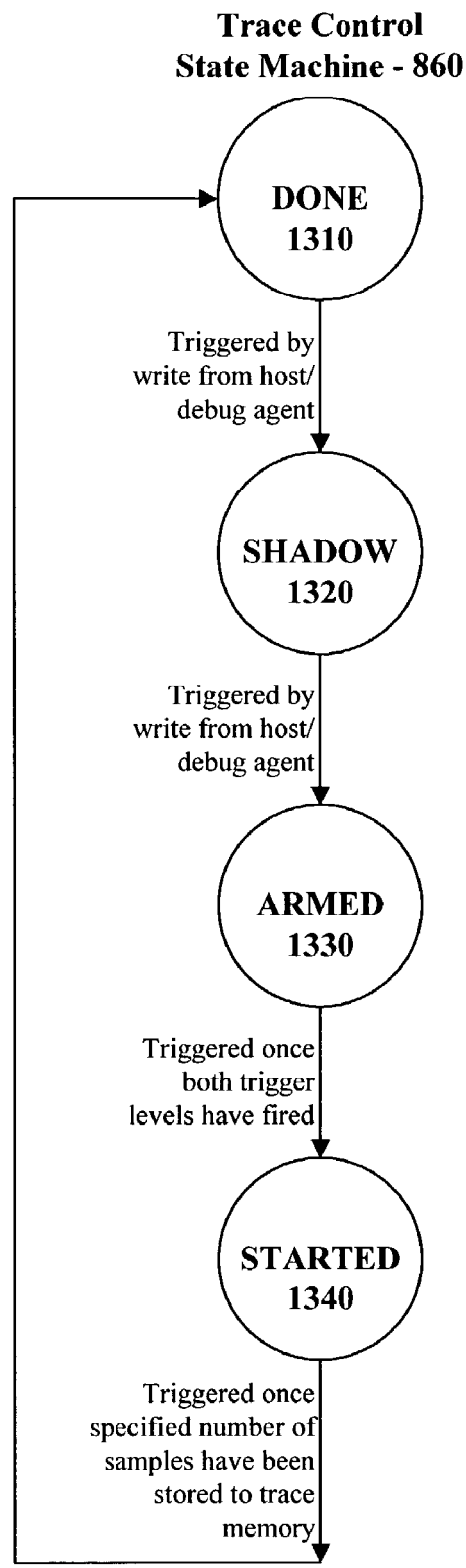
FIG. 13 shows a trace control state machine of the SoC.

FIG. 13 is the state diagram for an embodiment of the trace control state machine 860 of the present invention. As shown, this example of the trace control state machine flow includes four states: Done, Shadow, Armed, and Started. In first state, the Done state 1310, the trace control state machine 860 is idle. Also in this state, an external host agent can either download the contents of the trace memory and shadow register or set up the trace control registers for the next trace capture.

Once the trace control module is setup for trace capture by an external host agent, the trace control state machine 860 is triggered to the next state, the Shadow state 1320. In the Shadow state 1320, the trace control module tracks the register writes occurring within a processing core identified for trace capture and updates the shadow register as these writes occur. At transition out of this state, the trace control module has a snapshot of the contents of the target processing core's main register file contents. Transition out of this state is triggered by a write from an external host agent.

The next state is the Armed state 1330. In this state, the trace control module stops shadowing the target processing core's main register file and starts writing trace data from the target processing core into trace memory. When wrap-around occurs within the trace memory, the overwritten entries are used to update the shadow register contents. Transition out of the Armed state 1330 occurs when the trace data fields have matched and the count register is zero.

The last state is the Started state 1340. In this state, the trace control module is completely triggered and begins counting down the specified number of samples to be stored in trace memory before transitioning back to the Done state 1310. The timing diagram example of FIG. 9 shows the sample count decrementing from 0x64 to 0 after the machine has fully triggered (i.e., the trace hardware was setup to capture 100 samples after triggering). As in the Armed state 1330, if wrap-around occurs within the trace memory during the Started state 1340, the overwritten entries are used to update the shadow register contents. Upon storing the specified number of samples, the trace control state machine transitions to the Done state 1310 and prepares to off-load the stored trace data and receive new set-up data.

Not all of the trace data produced by a processing core and stored in the trace memory during the Started state is useful for examining every problem. An additional aspect of a presently preferred embodiment of the trace control state machine 860 is the ability to filter trace date before writing the data into trace memory. As a way to make more efficient use of the limited trace memory, a user may want to only store samples of interest. In this case, filtering can be enabled. The criteria for a trace sample passing the filter is similar to that for a triggering level (i.e., compare and mask registers, range mode bit, etc.). For example, consider the following unfiltered trace output:

| status | Data | Address | | Decode |
|--------|------|---------|---|--------|
| 0x0140 | 0x00000002 | 0x401fff8c | | Bubble due to register dependency |
| 0x00ca | 0x00000000 | 0x40001075 | | 24-bit insn, j or call, target addr 0x40001075 |
| 0x01d7 | 0x00000000 | 0x40001095 | | 16-bit insn, store insn, store to 0x40001095 |

-continued

| status | Data | Address | | Decode |
|---|---|---|---|---|
| 0x0144 | 0x00000002 | 0x40001097 | | Bubble due to control transfer |
| 0x0104 | 0x00000002 | 0x401fff8c | | Bubble due to control transfer |
| 0x0140 | 0x00000000 | 0x40001077 | | Bubble due to register dependency |
| 0x0113 | 0x00000000 | 0x4000107d | | 16-bit insn, Load insn from: 0x4000107d: Data: 0 |
| 0x0104 | 0x00000000 | 0x4000107a | | Bubble due to register dependency |
| 0x0146 | 0x00000000 | 0x4000107d | | 24-bit insn, Branch taken to: 0x4000107d |
| 0x0193 | 0x00000003 | 0x401fff88 | | 16-bit insn, Load insn from: 0x401fff88 |

With filtering, it is possible to remove the bubbles from this trace. With bubble filtering enabled, the same trace would produce the following output:

| status | Data | Address | | Decode |
|---|---|---|---|---|
| 0x00ca | 0x00000000 | 0x40001075 | | 24-bit insn, j or call, target addr 0x40001075 |
| 0x01d7 | 0x00000000 | 0x40001095 | | 16-bit insn, store insn, store to 0x40001095 |
| 0x0113 | 0x00000000 | 0x4000107d | | 16-bit insn, Load insn from: 0x4000107d: Data: 0 |
| 0x0146 | 0x00000000 | 0x4000107d | | 24-bit insn, Branch taken to: 0x4000107d |
| 0x0193 | 0x00000003 | 0x401fff08 | | 16-bit insn, Load insn from: 0x401fff88 |

While the filtered trace output would require much less storage in trace memory, the user would lose information on how many cycles it took to accomplish the operation.

As shown in FIG. 2, an aspect of the present invention includes the ability to capture trace data from multiple processing cores at the same time. To facilitate this simultaneous trace data capture, the SoC 200 will include a number, x+1, of daisy-chain buses 260 equal to the number of processing cores requiring simultaneous tracing. Additionally, referring again to FIG. 8, if simultaneous trace data capture is desired, then the trace control state machine 860 triggering logic, including trace control registers 850, is duplicated to equal the number of processing cores requiring simultaneous tracing. However, the interface for reading from and writing to the trace control registers 850 is not replicated. Likewise, the internal trace data bus 810 will have one channel for each daisy-chain bus 260. A separate shadow register 830 is needed for each simultaneous processing core being traced. Trace memory 820 need not be duplicated. However, the trace memory 820 will be partitioned in a number of memory banks equal to the number of processing cores requiring simultaneous tracing. Additionally, the trace memory 820 will have one interface trace channel for each memory bank. Because of the trace memory 820 multiple channel interface and multiple bank configuration discussed above, multiple traces can be written into a single trace memory 820 simultaneously. The trace control state machine 860 generates addresses into the trace memory 820 for the number of processing cores being simultaneously traced and multiplexes the appropriate trace data to the appropriate trace memory segment. This address generation logic used for each internal trace data bus 810 channel is the same as previously shown in FIG. 11.

An additional aspect of the present invention as shown in FIG. 8 is to make the trace memory 820 smaller without sacrificing trace sample length. This aspect is accomplished when used in conjunction with the compression nodes as shown in FIG. 4 or the compress trace capture nodes as shown in FIG. 5. Using either of these data compression designs necessitates additional logic in the trace control state machine 860 to uncompress trace data for the purpose of triggering and filtering. However, the trace control state machine 860 can subsequently recompress the trace data before storage in the trace memory 820. This allows the trace memory 820 to be smaller than when used to store uncompressed trace data, yet still maintaining the ability to store the desired length of trace data.

As shown in the example debugging system of FIG. 1, a preferred embodiment of the present invention includes the SoC 200 communicating with a host agent 1400. The host agent 1400 is in communication with the host system 110. The host system 110 provides a user interface and includes debug software. The host agent 1400 translates host system commands into SoC 200 formatted instructions. The host agent 1400 also receives stored trace data from the SoC 200 trace memory and shadow register, and translates these data into host system 110 formatted instructions.

Another aspect of the example host system in FIG. 1 includes host debugger software and a host debug server. The host debug server is the interface between the host agent 1400 and the host debugger software. A user can specify the SoC JTAG TAP controller layout to the host debug server, along with the daisy-chain bus and processing core layout, as described in U.S. patent application Ser. No. 09/680,126 to Newlin et al., for example. In this way, the host debug server is able to present stored trace data to the host debugger software as desired, and how desired. Also, the host debug server properly formats commands from the host debugger software to each appropriate TAP controller. Generally, host debugger software has a set of commands for viewing and manipulating processing core state, and this software is capable of retrieving that state through the host agent (via the host debug server) and displaying it to the user on an instruction by instruction basis. Also, because processing core trace data are written as a series of statements, the host debugger software is able to replay the trace data for the user on a statement by statement basis. Additionally, as previously mentioned regarding multiple processing core trace data, the host debugger software, knowing the SoC layout, can account for trace data latencies and simultaneously display multiple processing core traces.

Figure 14:
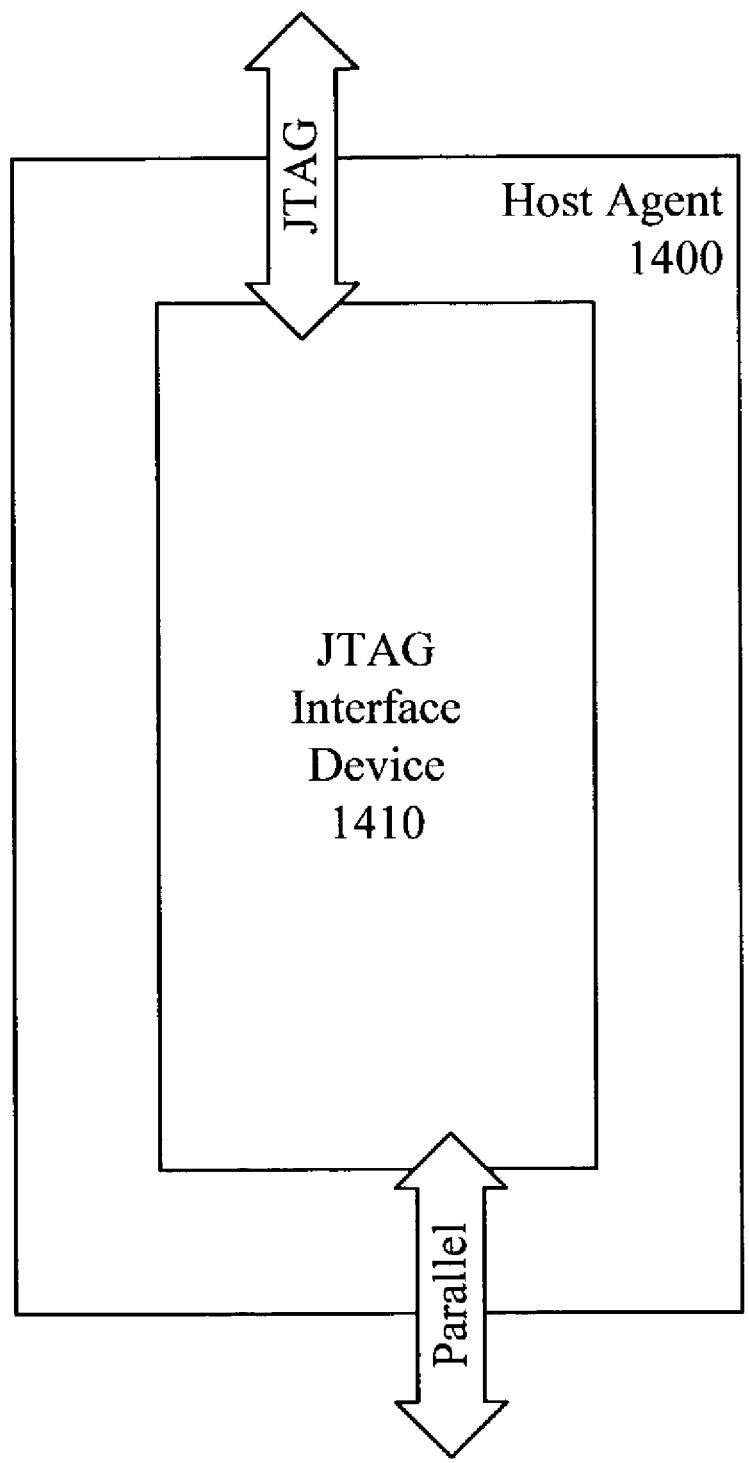
FIG. 14 shows a host agent of the trace and debug system of the present invention.

FIG. 14 illustrates an example host agent of the present invention. As shown, host agent 1400 contains the JTAG interface device for communication between the SoC and the host system. The JTAG interface device 1410 takes parallel port input data from the host system and translates that parallel data to serial JTAG control data for use by the SoC. Generally, a single command received from the host system may require a series of commands sent by the JTAG interface device 1410 to the SoC TAP controllers. As previously noted, alternatively, the host agent 1400 can be an integral part of and run on the SoC by using one of the SoC processing cores to run the host agent 1400 software for the remaining processing cores.

In a separate embodiment of the present invention, aspects of the invention are incorporated into and used by the Xtensa Processor Architecture and Tool Set System from Tensilica, Inc., Santa Clara, Calif. The remainder of this description will address the Xtensa embodiment of the present invention. The Xtensa Instruction Set Architecture is described in U.S. Pat. No. 6,282,633 to Killian et al. and also in the Xtensa Instruction Set Architecture Reference Manual.

Configurability of aspects of a processing core other than the trace data debug out bus are handled as described in co-pending U.S. patent application Ser. No. 09/680,126 to Newlin et al. Many of these issues apply to the decoding of a trace data. For example, endian-ness of the processor affects the encoding of the instructions and must be taken into account when decoding the trace data. The application also describes how software debugging tools can handle multiple processing cores on a single chip.

During initial implementation, configurability of the trace data debug out bus is handled by requiring that all of the processing cores have certain specific configuration options. In particular, they must all have the trace option and the data trace option.

Note that there are a variety of additional ways to handle the issues of configurable processing cores connected for tracing on the SoC. The first way is to allow a set of homogeneous processing cores of different trace data debug out bus configurations. In the T1040 Xtensa processing core, the trace data debug out bus has two different configurations. The basic configuration has 40 signals, with the extended data trace option including an additional 39 signals. One simple solution is to allow any configuration of the processing cores on the daisy-chain bus as long as they all have the same configuration. This restriction guarantees that all of the processing cores are presenting a uniform set of data and allows the trace capture nodes to be of minimal size. Another solution is to restrict the data on the trace data debug out bus from the maximum set to the more minimum set, which will, of course, ripple into the trace control module. Last, there is a third solution dealing with configurability of the processing core trace data debug out bus. That solution is to size the trace capture nodes and daisy-chain buses to the largest of the connected processing core trace data debug out buses. Processing cores that produce a smaller set of trace signals would tie the additional, unused trace signal lines to ground or Vcc, thereby setting these additional signal lines to a benign value. This allows some connected processing cores on the SoC to present more data than other connected processing cores. Configuring the processing core trace data can be reflected in the configuration of the trace control module.

The trace control module in the Xtensa embodiment is configurable. The ideal size of the trace memory, the number of triggers, and the types and numbers of filters are going to vary by application. In one example, a user can change the amount of trace memory managed by the trace control module from a few hundred bytes to a few hundred thousand bytes. This enables the user to spend whatever amount of SoC area on trace memory their application may dictate.

As discussed above, the sizing of the processing core trace data itself can be matched by changes in the trace control module. The triggers and filters in the trace control module can also be sized to match the size of the processing core trace data. Each trigger and each filter requires additional gates. The trace control module can have different numbers of triggers and filters to allow the user to choose gates optimally.

Also in the Xtensa embodiment, the shadow register file is optional. As will be seen below, when describing the Xtensa software for the present invention, the information in the shadow register file is often not necessary. For this reason, the presence of the shadow register file is also configurable.

The state of a traced processing core in the Xtensa embodiment is composed of both the current program execution address on the processing core, and the value of registers and memory in the processing core. A portion of the host system debugger software, called the trace simulator or tracesim, reconstructs the values of registers and memory based on data captured by the trace controller state machine and stored in trace memory and the shadow register. The trace simulator can successfully reproduce the state of any processing core if it is provided with a snapshot of the core's register contents just prior to capturing the trace data (i.e., the shadow register contents), and if the trace data includes information about which registers of the processing core were updated during the trace and with what values these registers were updated (i.e., the trace memory content). This aspect is discussed in further detail, below.

The software tools for the Xtensa embodiment should be able to retrieve the trace data that is captured in the trace memory, as well as the contents of the shadow register. The software should also be able to manipulate the trigger and filter controls. Because of this, the software should know the composition of the processing cores on the SoC as well as the configuring of the daisy-chain buses and any JTAG chain. For example, the host agent debug server loads in a file called the topology file. This file is similar to the one described in co-pending U.S. patent application Ser. No. 09/680,126 to Newlin et al. and in the Xtensa On-Chip Debug Mode User's Guide, except for the present invention this file has been augmented to understand the concept of a trace control module and expects the trace control module to implement the additional commands described in Table 2.

TABLE 2

| Instruction Type | PDebugData[63:32] | PDebugData[31:0] |
| --- | --- | --- |
| Default (regular instruction) | Register Writeback data | Current PC |
| Branch-taken or loop not taken | Not used | Instruction Virtual Address of Target |
| J and call | Not used | Instruction Virtual Address of Target |
| jx, callx, and all returns (including rfe) | Not used | Instruction Virtual Address of Target |
| Load Instructions (including TIE loads) | Register writeback data | Data virtual address |
| Store Instructions (including TIE stores) | Store Write Data | Data virtual address |

TABLE 2-continued

| Instruction Type | PDebugData[63:32] | PDebugData[31:0] |
| --- | --- | --- |
| Loop instruction or an instruction that modifies the LBEGIN register | Not used | Loop Begin Virtual address |

The configuration of each processing core debug out bus, each trace capture node, and each daisy-chain bus is described to the debug server in the topology file. In particular, each entry in the topology file for a trace control module has the parameters listed in Table 3.

TABLE 3

| Section | Key | Description |
| --- | --- | --- |
| [main] | number_of_xtensas | Number of Xtensa processors |
| | number_of_generic | Number of instances of the generic TAP controller |
| | number_of_other | Number of other (bypassed) TAP controllers |
| | trace_position | Position of the trace TAP on the chain. |
| [generic_description] | IR_Width | Instruction register length in bits |
| | bypass | Bypass instruction (usually all 1's) |
| | bypass_length | Bypass data register length (usually 1) |
| | number_regs | Number of accessible data registers |
| [generic_reg_X] | gdb_name | Name given to data register for GDB access |
| | Width | Data register length in bits |
| | Read_Instruction | Instruction that selects data register (if readable) |
| | Write_instruction | Instruction that selects data register (if writable) |

TABLE 3-continued

| Section | Key | Description |
| --- | --- | --- |
| [xtensaX] | position | Position of Xtensa processor on the chain |
| [genericX] | position | Position of generic TAP instance on the chain |
| [otherX] | position | Position of bypassed TAP controller on the chain |
| | IR_Width | Instruction register length in bits |
| | bypass | Bypass instruction (usually all 1's) |
| | bypass_length | Bypass data register length (usually 1) |

While the topology file includes, among other items, information about the JTAG topology, the processing core order on the daisy-chain is also important. In this embodiment of the invention, this information is passed by the user to the trace control module, though it could just as easily be stored in a file analogous to the topology file. The state of each daisy-chain for the processing cores includes more information than just the order of the processing cores along its length. It also contains the number of clock cycles that it takes trace data to go from one trace capture node to the next, as well as potential configuration information about each trace capture node in the daisy-chain. The addition of registers is for the convenience of physical design and layout, and creates issues easily managed by the software tools.

The communication between the host system debugger software and the host agent debug server in the Xtensa embodiment is based on the protocols described in the co-pending U.S. patent application Ser. No. 09/680,126 to Newlin et al., with additions highlighted in Table 3. Consider the following example of the user's experience of playback of a trace.

```
~/test/trace-test/zol ->xt-gdb loop_target.elf
GNU gdb 4.17
Copyright 1998 Free Software Foundation, Inc.
GDB is free software, covered by the GNU General Public License, and you are
welcome to change it and/or distribute copies of it under certain conditions.
Type "show copying" to see the conditions.
There is absolutely no warranty for GDB. Type "show warranty" for details.
This GDB was configured as "--host=i686-pc-linux-gnu --target=xtensa-elf" . . .
(xt-gdb) target trace-sim trace.bin
Connected to the simulator.
(xt-gdb) r
Remote debugging using localhost:49467
0x40001713 in __mulsi3 ( )
(xt-gdb) si
0x40001716 in __mulsi3 ( )
(xt-gdb) display/i $pc
1: x/i $pc 0x40001716 <__mulsi3+58>:    bgeui     a3, 16, 0x40001724 <__mulsi3+72>
(xt-gdb) si
0x40001719 in __mulsi3 ( )
1: x/i $pc 0x40001719 <__mulsi3+61>:    neg       a3, a2
(xt-gdb) si
0x4000171c in __mulsi3 ( )
1: x/i $pc 0x4000171c <__mulsi3+64>:    movltz    a2, a3, a5
(xt-gdb) si
0x4000171f in __mulsi3 ( )
1: x/i $pc 0x4000171f <__mulsi3+67>:    retw.n
(xt-gdb) si
22                      k+=k*j;
```

-continued

```
1: x/i $pc 0x40001048 <main+20>:        add.n       a2, a2, a10
(xt-gdb) p/x $wb
$1 = 0x1
(xt-gdb) si
21                          for (k=0;k<10;k++) {
1: x/i $pc 0x4000104a <main+22>:        addi.n      a2, a2, 1
(xt-gdb) p/x $a2
$2 = 0x0
(xt-gdb) si
0x4000104c         21       for (k=0;k<10;k++) {
1: x/i $pc 0x4000104c <main+24>:        bge         a5, a2, 0x40001040 <main+12>
(xt-gdb) p/x $a2
$3 = 0x1
(xt-gdb) si
22                          k+=k*j;
1: x/i $pc 0x40001040 <main+12>:        mov.n       a10, a2
(xt-gdb) p/x $a10
$4 = 0x0
(xt-gdb) p/x $a2
$5 = 0x1
(xt-gdb) si
0x40001042         22                   k+=k*j;
1: x/i $pc 0x40001042 <main+14>:        or          a11, a7, a7
(xt-gdb) p/x $a10
$6 = 0x1
(xt-gdb) quit
The program is running. Exit anyway? (y or n) y
~/test/trace-test/zol ->
```

Note that in the example, the user has access to register values as well as the current execution location of the program.

After a trace is successfully captured and off-loaded, the Xtensa debugger software will leave a trace file host system. This trace file contains a sample by sample history of the information that came from a processing core's trace data debug out bus. The exception to this is if the user filtered the trace data prior to storage in the trace memory. However, for the Xtensa embodiment, the expectation for successful trace file playback is that only bubbles are filtered. In this way, the trace file is played back through "xt-gdb" (see example, below). A trace file contains two pieces of content. First it contains a copy of the shadow register along with information identifying which shadow registers is valid for which processing core trace data. Secondly it contains the trace data that is captured for that processing core into the trace memory.

FIG. 15 shows the flowchart of the trace simulator for the Xtensa embodiment. The initial three steps in this flow are performed by the host agent debug server, the remainder is performed by the host system debugger software. As shown in the flowchart of FIG. 15, when "xt-gdb" connects to the trace simulator, the trace simulator reads in the given trace file along with the associated executable and linking format (ELF) file. The trace file contains the information that was collected by the trace control module, and the ELF file contains the instructions of the program that were executing on the processing core during trace. The trace simulator takes this information and reconstructs the state of the processing core at each cycle.

The current program counter (PC) for each cycle is pre-computed when trace simulator starts up. The state of the register file is updated as the simulation progresses, based on data from the trace file and from the ELF file. The PC for any given sample is computed in the following manner, with reference to Table 2. First, if the instruction is a regular instruction, then accept the data in PDebugData [31:0] as the current PC. Set some global state of what the expected next PC is by adding 2 or 3 to this PC (depending on whether this current PC was a 16 or 24 bit instruction). Next, for any other type of instruction use the expected next PC as previously determined, and set a new expected next PC as either the target virtual address for calls, jumps and branches taken, or the current PC plus 2 or 3 (based on size of current instruction). Last, for any instruction, a check is performed to see if a loop-back is due because of a zero overhead loop. If a loop-back is due, then set the next expected PC to the value stored in LBEGIN. If the value stored in LBEGIN is not known, then mark the next expected PC as unknown.

The information that is available at any given cycle is dependent on the type of instruction that retired on that cycle. A retired instruction can be any of the types listed above in Table 2. Along with this information, some status information is also collected. Status information includes: whether the last instruction was of a "zero-overhead loop", whether address register was written, and the size of the retired instruction (16 or 24 bits).

While using "xt-gdb" and the trace simulator to debug simulation results of the Xtensa embodiment, users are able to set breakpoints, inspect memory, and inspect register values. Stepping and or running is accomplished by stepping through each element of the trace, and combining that data from information stored in the accompanying ELF file. The Window Base register (WB) must also be tracked to correctly track register file updates. The WB can be implied by most regular instructions that write to the register file. In these cases, the instructions contain the register number (e.g., a0 . . . a15), and the status information contains the physical register number (e.g., ar0 . . . 31 or ar0 . . . 63). On the completion of each instruction, the current value of WB is updated. Both entry and return instructions modify the value of WB, so these must be handled specially. Details of Xtensa register windowing are described in the Xtensa ISA Reference Manual.

Memory values are inferred by tracking all load and store instructions. These instructions output the virtual address of a memory location. Load instructions contain the data loaded, and cause an update to an internal cache of memory locations in the trace simulator. Stores to memory update the internal cache, but only if the register being written contains valid data.

Additionally, the Xtenxa embodiment of the present invention updates Tensilica's xocd daemon to interface with the trace control registers by performing the task of reading to and writing from the TAP controller address and data registers. Opening a special TCP/IP socket to the host system running the xocd daemon creates a pathway where a user can read and write trace control registers in a simple fashion. This TCP/IP interface uses a simple text based protocol, that accepts two commands in the following format:

SET_TRIG_REG, reg_number, reg_value
GET_TRIG_REG, reg_number where reg_number is the address of the trace control register being read from or written to, and reg_value is the value being read or written, respectively. Responses to these commands are:

OK
register value
ERROR

The response to a command to read from a register is either the register value or the "ERROR" string. The response to a command to write to a register is either the "OK" string or the "ERROR" string. All commands and responses are separated by a linefeed character.

While the present invention has been described herein with reference to particular embodiments thereof, a latitude of modification, various changes and substitutions are intended in the foregoing disclosure. Accordingly, it will be appreciated that in some instances some features or aspects of the invention will be employed without a corresponding use of other features or aspect, without departing from the spirit and scope of the invention as set forth in the appended claims. Additionally, variations on the present invention will become readily apparent to those skilled in the art after reading this description, and the present invention and appended claims are intended to encompass such variations as well.

What is claimed is:

1. A method for testing an integrated circuit having a plurality of processing cores, the method comprising:
   simultaneously receiving trace data from certain processing cores of the plurality of processing cores in substantially real time;
   storing on the integrated circuit a desired amount of the received trace data from a selected one processing core of the certain processing cores; and
   storing on the integrated circuit an additional desired amount of the received trace data from a selected additional processing core of the certain processing cores simultaneously with storing the desired amount of the received trace data from the selected one processing core.

2. The method of claim 1, further comprising:
   compressing the desired amount of the received trace data from the selected one processing core.

3. The method of claim 1, further comprising:
   communicating the stored trace data from the selected one processing core to a host agent.

4. The method of claim 3, wherein the host agent is one of the plurality of processing cores.

5. The method of claim 3, wherein the host agent is external to the integrated circuit.

6. The method of claim 3, further comprising:
   transferring the communicated trace data to a host system; and
   analyzing the transferred trace data.

7. The method of claim 6, wherein the host system includes the host agent.

8. The method of claim 1, wherein the desired amount of the received trace data includes a shadow register segment representing an internal state of the selected one processing core.

9. The method of claim 1, wherein the trace data received from the plurality of processing cores are stored in a dedicated memory of the integrated circuit.

10. The method of claim 1, further comprising:
    compressing the desired amount of the received trace data from the selected one processing core; and
    compressing the additional desired amount of the received trace data from the selected additional processing core.

11. The method of claim 1, further comprising:
    communicating the stored trace data from the selected one processing core and from the selected additional processing core to a host agent.

12. The method of claim 11, further comprising:
    transferring the communicated trace data to a host system; and
    analyzing the transferred trace data.

13. The method of claim 12, wherein analyzing the transferred trace data includes:
    reconstructing a history of the stored trace data; and
    presenting the history through a debugger software.

14. The method of claim 1, wherein:
    the desired amount of the received trace data includes a shadow register segment representing an internal state of the selected one processing core; and
    the additional desired amount of the received trace data includes an additional shadow register segment representing an internal state of the selected additional processing core.

15. The method of claim 14, wherein each internal state includes an initial state of each associated processing core.

16. A method for testing an integrated circuit having multiple processing cores, the method comprising:
    selecting a plurality of processing cores from the multiple processing cores on the integrated circuit, wherein selecting the plurality of processing cores includes:
       sending a plurality of select signals to a plurality of multiplexers on the integrated circuit, the plurality of multiplexers being coupled together forming one or more daisy-chain buses;
    receiving a quantity of trace data from each of the plurality of processing cores; and
    storing, simultaneously, the received quantities of trace data in a dedicated memory of the integrated circuit.

17. The method of claim 16, wherein receiving the quantities of trace data includes:
    multiplexing the received quantities of trace data onto the one or more daisy-chain buses using the plurality of select signals;
    associating the one or more daisy-chain buses with one or more data channels; and
    passing the multiplexed quantities of trace data along the one or more daisy-chain buses to the associated one or more data channels.

18. The method of claim 17, wherein storing the quantities of trace data includes:

dividing the dedicated memory into a plurality of memory blocks, each memory block of the plurality of memory blocks being subdivided into a plurality of memory banks;

associating each memory bank of the plurality of memory banks with a respective data channel of the one or more data channels; and writing the passed quantities of trace data to the associated memory bank.

19. An integrated circuit having multiple processing cores, the integrated circuit comprising:

means for selecting a plurality of processing cores from the multiple processing cores on the integrated circuit, wherein the means for selecting the plurality of processing cores includes:

means for sending a plurality of select signals to a plurality of multiplexers on the integrated circuit, the plurality of multiplexers being coupled together forming one or more daisy-chain buses;

means for receiving a quantity of trace data from each of the plurality of processing cores; and means for simultaneously storing the received quantities of trace data in a dedicated memory of the integrated circuit.

20. The integrated circuit of claim 19, wherein the means for receiving the quantities of trace data includes:

means for multiplexing the received quantities of trace data onto the one or more daisy-chain buses using the plurality of select signals;

means for associating the one or more daisy-chain buses with one or more data channels; and means for passing the multiplexed quantities of trace data along the one or more daisy-chain buses to the associated one or more data channels.

21. The integrated circuit of claim 20, wherein the means for storing the quantities of trace data includes:

means for dividing the dedicated memory into a plurality of memory blocks, each memory block of the plurality of memory blocks being subdivided into a plurality of memory banks;

means for associating each memory bank of the plurality of memory banks with a respective data channel of the one or more data channels; and means for writing the passed quantities of trace data to the associated memory bank.

22. An integrated circuit having multiple processing cores, the integrated circuit comprising:

a plurality of processing cores;

at least one trace capture node;

a trace control module;

at least one debug out bus, wherein the at least one debug out bus is coupled to at least one processing core of the plurality of processing cores and to the at least one trace capture node;

at least one daisy-chain bus, wherein the at least one daisy-chain bus is coupled to the at least one trace capture node and to the trace control module; and at least one interface, wherein the at least one interface is coupled to the trace control module.

23. The integrated circuit of claim 22, wherein the at least one interface is a JTAG interface.

24. The integrated circuit of claim 22, wherein the at least one interface is a system bus interface, the system bus interface being coupled to a system bus.

25. The integrated circuit of claim 22, further comprising:

at least one compression node, the at least one compression node being coupled to the at least one trace capture node and to the at least one debug out bus.

26. The integrated circuit of claim 22, wherein the at least one trace capture node comprises:

at least one multiplexer, the at least one multiplexer having:
a first multiplexer input;
a second multiplexer input;
a multiplexer output; and
a multiplexer select input;

at least one register, the at least one register having:
a register input, the register input being coupled to the multiplexer output;
a register output; and
a register clock input;

at least one daisy-chain bus output, the at least one daisy-chain bus output being coupled to the register output;

at least one select input, the at least one select input being coupled to the multiplexer select input; and a clock input, the clock input being coupled to the register clock input.

27. The integrated circuit of claim 26, further comprising:
a debug out bus input;
a debug out bus output; and
at least one daisy-chain bus input.

28. The integrated circuit of claim 27, wherein:
the debug out bus input is coupled to the first multiplexer input;
the debug out bus output is coupled to the debug out bus input; and
the at least one daisy-chain bus input is coupled to the second multiplexer input.

29. The integrated circuit of claim 27, further comprising:
at least one compress logic, the at least one compress logic having:
a compress logic input, the compress logic input being coupled to the debug out bus input;
a compress logic output, the compress logic output being coupled to the first multiplexer input; and wherein
the at least one daisy-chain bus input is coupled to the second multiplexer input.

30. The integrated circuit of claim 22, wherein the trace control module comprises:
a trace data bus;
a trace memory;
a plurality of trace control registers;
at least one trace control state machine;
at least one select output; and
a clock input.

31. The integrated circuit of claim 30, wherein:
the trace data bus includes at least one trace data channel, the at least one trace data channel being coupled to the at least one daisy-chain bus;
the trace memory includes at least one memory bank, the at least one memory bank being coupled to the at least one trace data channel; and
the plurality of trace control registers includes at least one of:
a compare register,
a mask register;
a range mode bit; and
a count register.

32. The integrated circuit of claim 30, further comprising:
   at least one shadow register, wherein the at least one shadow register is coupled to the trace memory and to the at least one trace data channel.

33. A portion of an integrated circuit having a plurality of processing cores, the portion of the integrated circuit comprising:
   a chain of trace capture nodes respectively coupled to certain processing cores of the plurality of processing cores for receiving trace output therefrom, each trace capture node in the chain of trace capture nodes including a multiplexer that selectively allows the trace output from either the respectively coupled certain processing core or another processing core on the chain to be passed along the chain; and
   a trace control module coupled to the chain for controlling the trace output selection by the trace capture node and storing the passed trace output.

34. The portion of the integrated circuit of claim 33, wherein the trace capture node further includes a compression logic for compressing the trace output of the certain processing cores.

35. The portion of the integrated circuit of claim 33, wherein the trace control module includes a trace control state machine that generates signals for controlling the trace output selection of the trace capture node.

36. The portion of the integrated circuit of claim 33, wherein the trace control module includes a trace memory.

37. The portion of the integrated circuit of claim 33, wherein the trace control module includes a shadow register file.

38. The portion of the integrated circuit of claim 33, wherein the trace control module includes compression logic for compressing the trace output.

* * * * *